US012486686B2

(12) United States Patent
Greer et al.

(10) Patent No.: US 12,486,686 B2
(45) Date of Patent: Dec. 2, 2025

(54) SPA COVER LIFT

(71) Applicant: Roberts Manufacturing LLC, Henderson, NV (US)

(72) Inventors: Jerry Greer, Henderson, NV (US); Jeff Coles, Chula Vista, CA (US); Justin Jobe, San Diego, CA (US)

(73) Assignee: ROBERTS MANUFACTURING LLC, Henderson, NV (US)

( * ) Notice: Subject to any disclaimer, the term of this patent is extended or adjusted under 35 U.S.C. 154(b) by 209 days.

(21) Appl. No.: 18/096,612

(22) Filed: Jan. 13, 2023

(65) Prior Publication Data

US 2023/0258010 A1 Aug. 17, 2023

Related U.S. Application Data

(60) Provisional application No. 63/311,020, filed on Feb. 16, 2022.

(51) Int. Cl.
*E04H 4/08* (2006.01)
*B66F 3/46* (2006.01)

(52) U.S. Cl.
CPC ............... *E04H 4/084* (2013.01); *B66F 3/46* (2013.01)

(58) Field of Classification Search
CPC ...................................................... E04H 4/084
See application file for complete search history.

(56) References Cited

U.S. PATENT DOCUMENTS

| | | | | | |
|---|---|---|---|---|---|
| 5,048,153 | A * | 9/1991 | Wall | E04H 4/084 | 16/400 |
| 5,950,252 | A * | 9/1999 | Fettes | E04H 4/084 | 49/386 |
| 5,974,599 | A * | 11/1999 | Tudor | E04H 4/084 | 4/500 |
| 6,032,305 | A * | 3/2000 | Tedrick | E04H 4/084 | 220/817 |
| 7,073,213 | B2 * | 7/2006 | Duarte | E04H 4/084 | 220/264 |
| 7,461,415 | B2 * | 12/2008 | Buzzetti | E04H 4/084 | 4/500 |
| 7,461,417 | B2 * | 12/2008 | Godbersen | A47K 3/003 | 248/125.7 |
| 7,600,272 | B2 * | 10/2009 | Coleman | E04H 4/084 | 4/498 |
| 2004/0143895 | A1 * | 7/2004 | Loyd | E04H 4/084 | 4/498 |
| 2023/0131973 | A1 * | 4/2023 | Fisher | E04H 4/084 | 4/498 |

* cited by examiner

*Primary Examiner* — Erin Deery
(74) *Attorney, Agent, or Firm* — Mitchell Law PLLC; Matthew W. Mitchell

(57) ABSTRACT

A spa cover lift is disclosed. The spa cover lift includes a support structure, and a lifting structure coupled to the support structure, the lifting structure having an actuator configured to store and release energy during lifting and storing of a spa cover. Embodiments of the spa cover lift include an electro-mechanical actuator configured to move the spa cover from between a “covered state” and a “stored state”.

18 Claims, 33 Drawing Sheets

SPA COVER LIFT

CROSS REFERENCE TO RELATED APPLICATIONS

This application claims the benefit of Provisional Application No. 63/311,020 filed on Feb. 16, 2022 which is hereby incorporated herein by reference.

TECHNICAL FIELD

This disclosure relates to spas, spa covers, and more particularly to spa cover lifts.

BACKGROUND

The statements in this section merely provide background information related to the present disclosure and may not constitute prior art.

Spas, also commonly known as hot tubs, are commonly used in many homes, hotels, and community centers. They generally include a deep, vacuum formed tub, with an internal frame structure, and often having a smooth acrylic liner that is filled with heated water and which is used for soaking and relaxation. Spas typically include water jets for massage purposes.

Because many spas are heated and remain heated when not in use, they are often equipped with covers for enclosing the tub when not in use. For outdoor spas these covers help prevent dirt, leaves and other debris from entering the water, and provide a safety function by preventing children and animals from falling into the water. Further, spa covers are often insulated so as to limit heat loss from the water when the spa is not in use, for purposes of energy efficiency and readiness of use.

A variety of known spa covers exist having different configurations adapted to conform to the open top of a spa. These spa covers often will include a thick, insulated foam pad covered with a protective housing or casing. Many spa covers are often foldable along a center fold to facilitate removal, replacement, and storage. Many covers are heavy or large, making removal or replacement difficult or cumbersome.

Many lifting device are known that ease the burden of removing and replacing the spa cover. These known lifting devices are disadvantaged in that they do not remove and store the cover in a compact manner nor provide efficient removal or replacement.

Hence, there remains a need for a cover lifter device for a spa that has improved performance properties and ease of use.

SUMMARY

A spa cover lift is disclosed. The spa cover lift includes a support structure, and a lifting structure coupled to the support structure, the lifting structure having an actuator configured to store and release energy during lifting and storing of a spa cover. Embodiments of the spa cover lift include an electro-mechanical actuator configured to move the spa cover from between a "covered state" and a "stored state."

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1A:
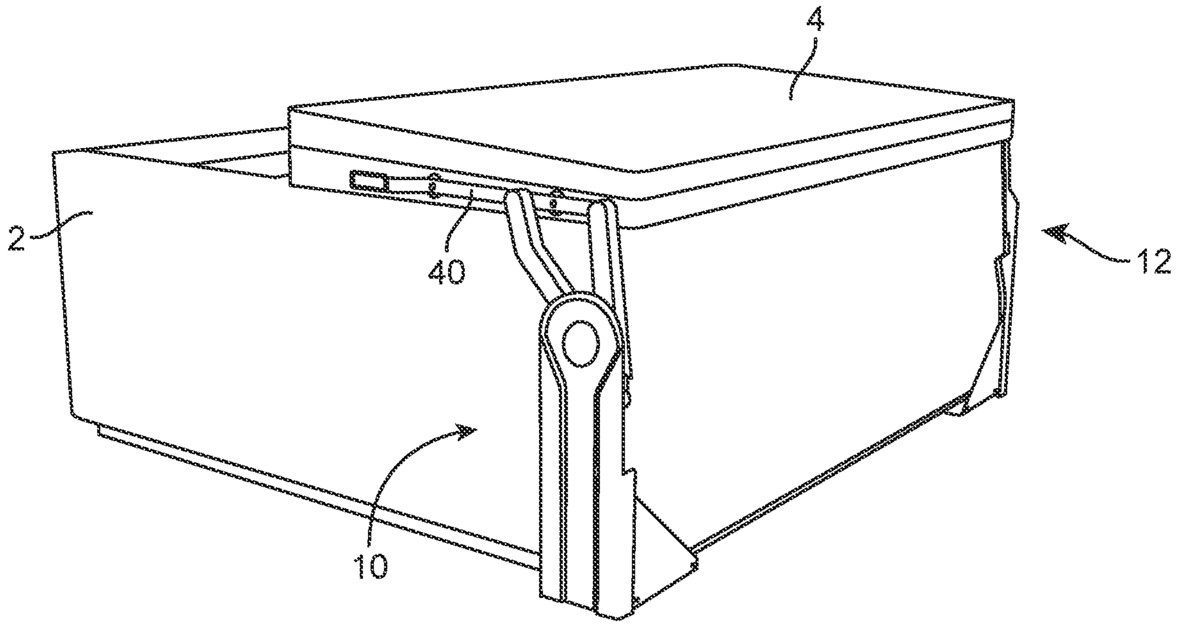
FIGS. 1A and 1B show an exemplary lift connected to an exemplary spa cover in a covered state on an exemplary spa, in accordance with the present disclosure.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto.

Additionally, any examples set forth in this specification are not intended to be limiting and merely set forth some of the many possible embodiments for the claimed invention.

As used in the description herein and throughout the claims, the following terms take the meanings explicitly associated herein, unless the context clearly dictates otherwise: the meaning of “a,” “an,” and “the” includes plural reference, the meaning of “in” includes “in” and “on.” The term “based upon” is not exclusive and allows for being based on additional factors not described, unless the context clearly dictates otherwise. Additionally, in the subject description, the word “exemplary” is used to mean serving as an example, instance or illustration. Any embodiment or design described herein as “exemplary” is not necessarily to be construed as preferred or advantageous over other embodiments or designs. Rather, use of the word exemplary is intended to present concepts in a concrete manner.

Figure 1B:
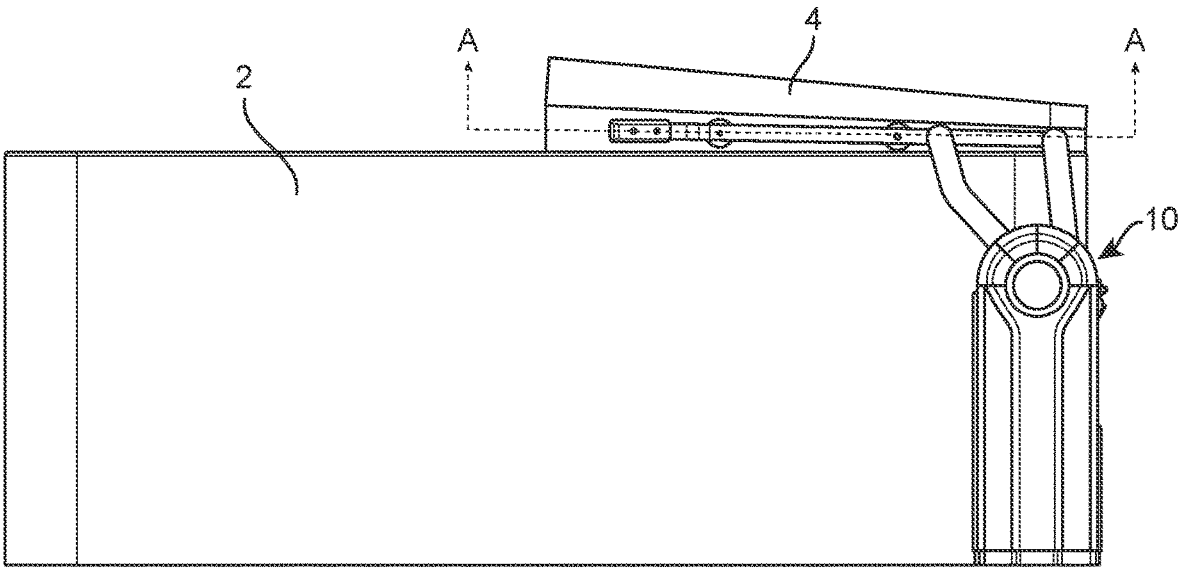
Figure 1C:
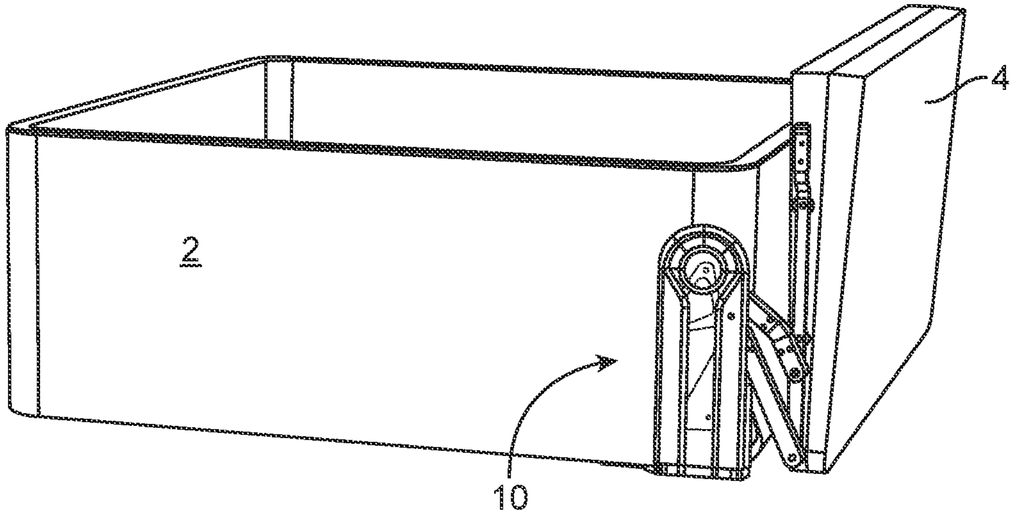
FIG. 1C shows the spa lift having the spa cover in a "stored state", in accordance with the present disclosure.

Referring now to the drawings, wherein the depictions are for the purpose of illustrating certain exemplary embodiments only and not for the purpose of limiting the same, FIGS. 1A and 1B show an exemplary first and second spa lift devices 10 and 12, respectively. As FIG. 1A shows, the spa lift devices 10 and 12 are preferably placed under corners of the spa 2 for use. Elongated lift arm members 40, i.e., lift arms, on either side of a spa cover 4 are preferably connected to impart movement thereto. FIGS. 1A and 1B shows the exemplary spa cover 4 in a “covered state”, while FIG. 1C shows the exemplary spa cover 4 in a “stored state.”

Components of the first and second spa life devices 20 and 20 may be formed of formed various material including of pressed and/or galvanized steel. Although, it is contemplated that other materials and manufacturing techniques may be utilized as appropriate upon a careful reading of the teachings herein.

Figure 2A:
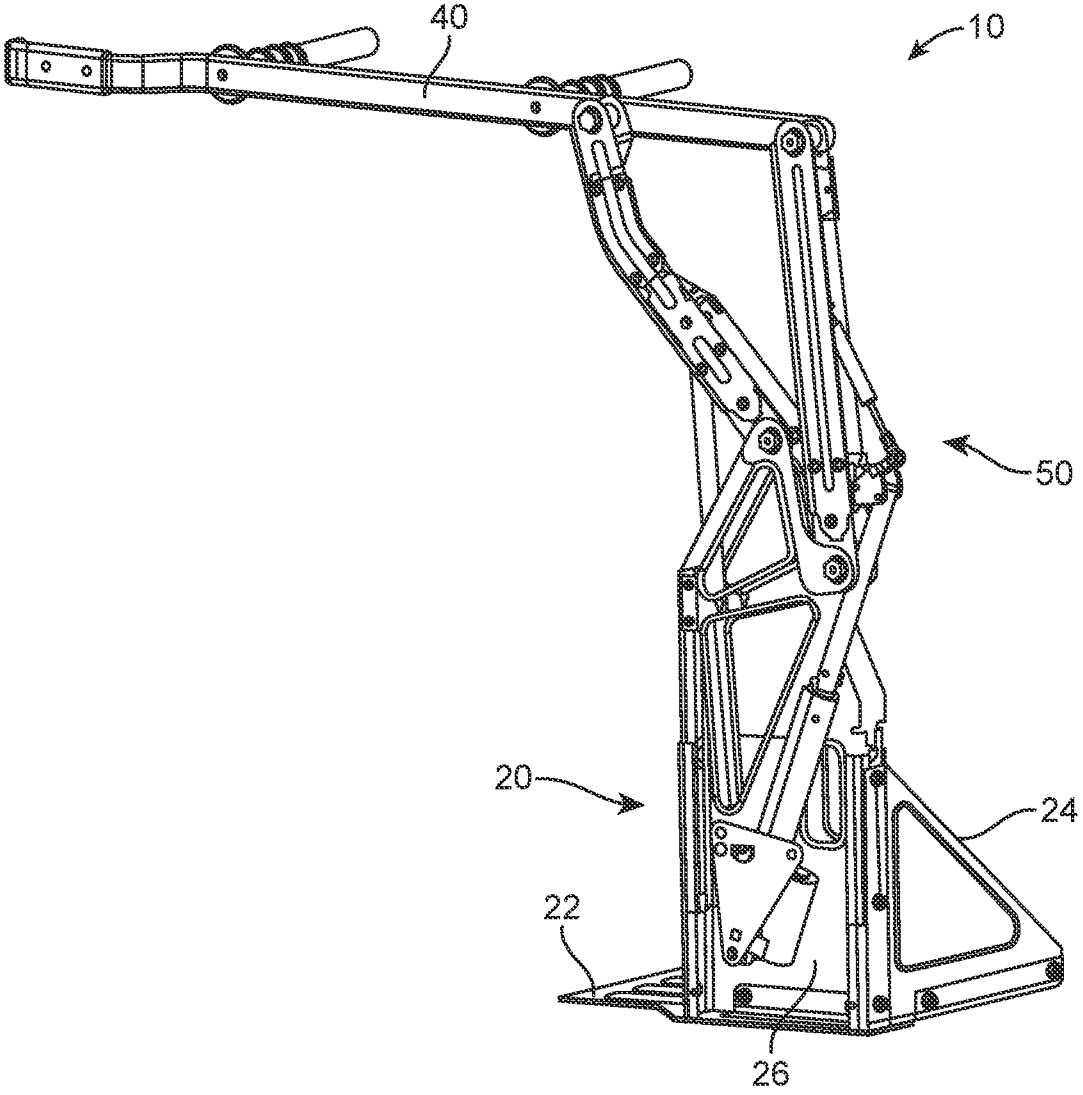
FIGS. 2A-2B shows the exemplary spa cover lift without a housing cover, in accordance with the present disclosure.
Figure 2B:
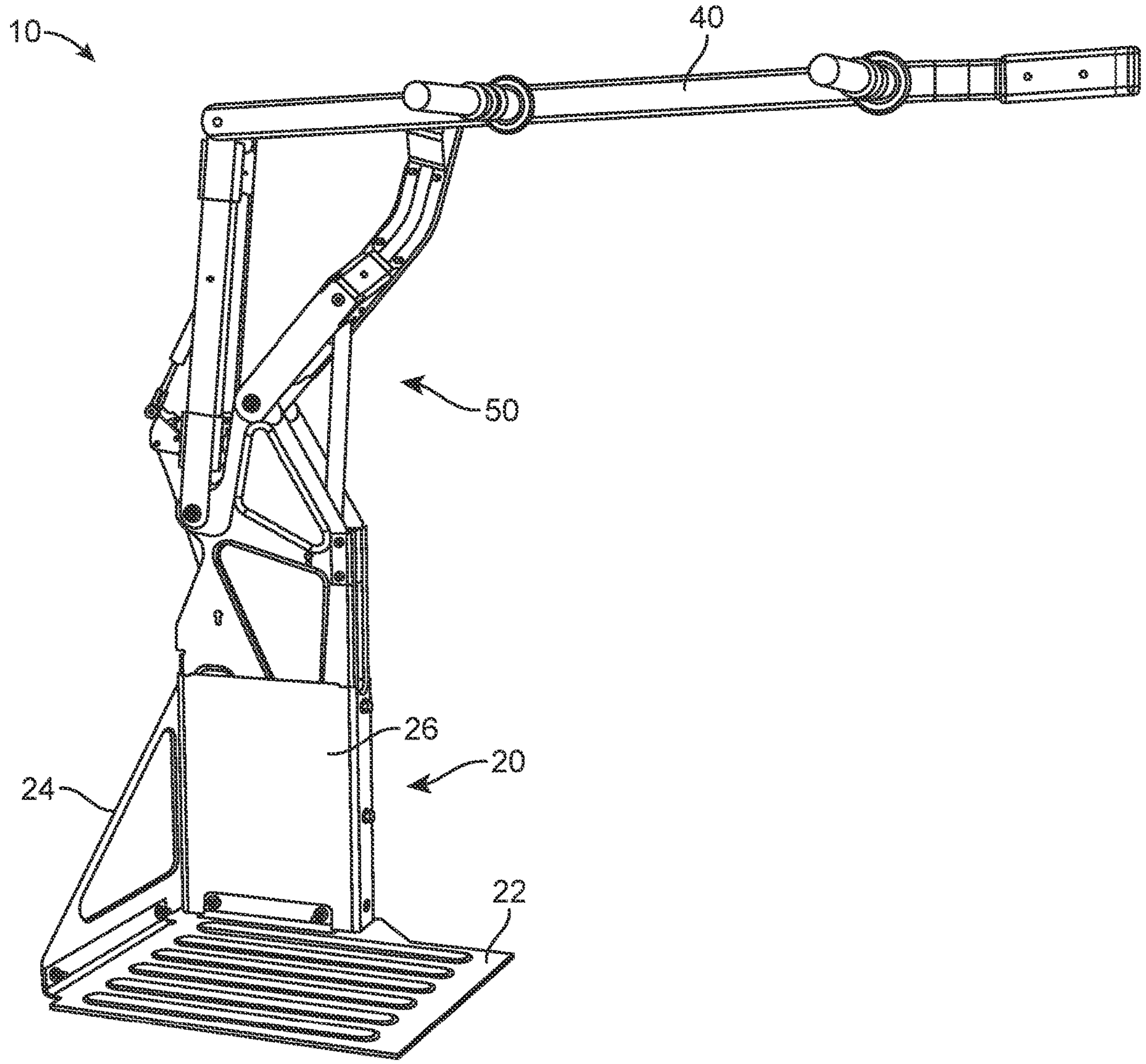

FIGS. 2A-2B shows the spa cover lift 10 with a housing cover removed. As FIGS. 2A-2B show, the spa cover lift 10 includes support structure 20 and a lifting structure 50.

Figure 3A:
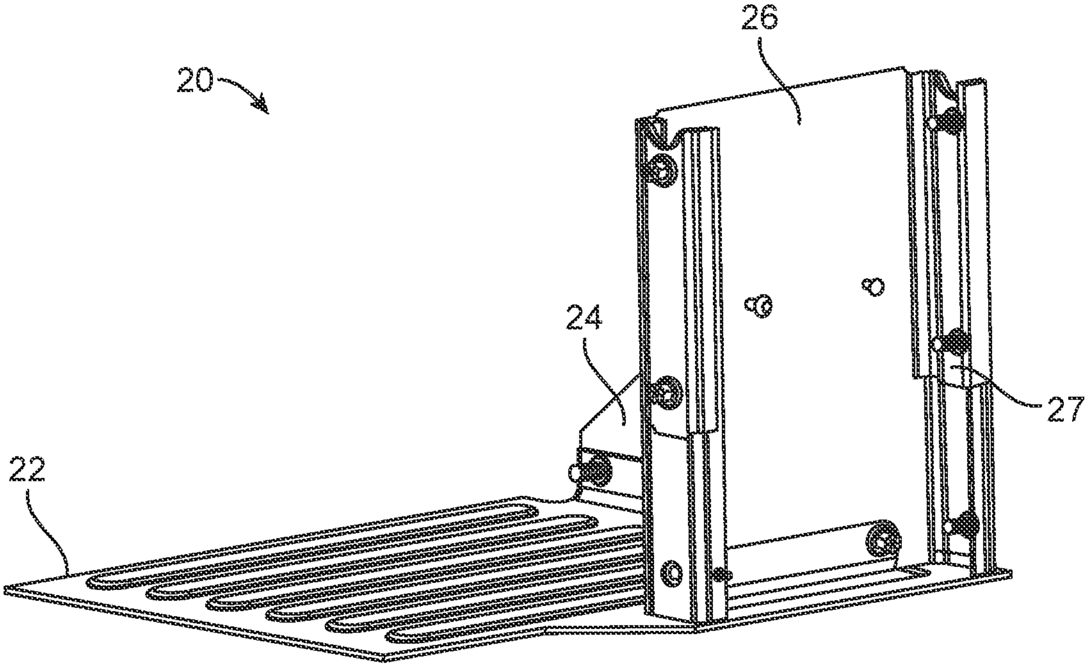
FIGS. 3A-3C show views of the support structure of the spa cover lift, in accordance with the present disclosure.
Figure 3B:
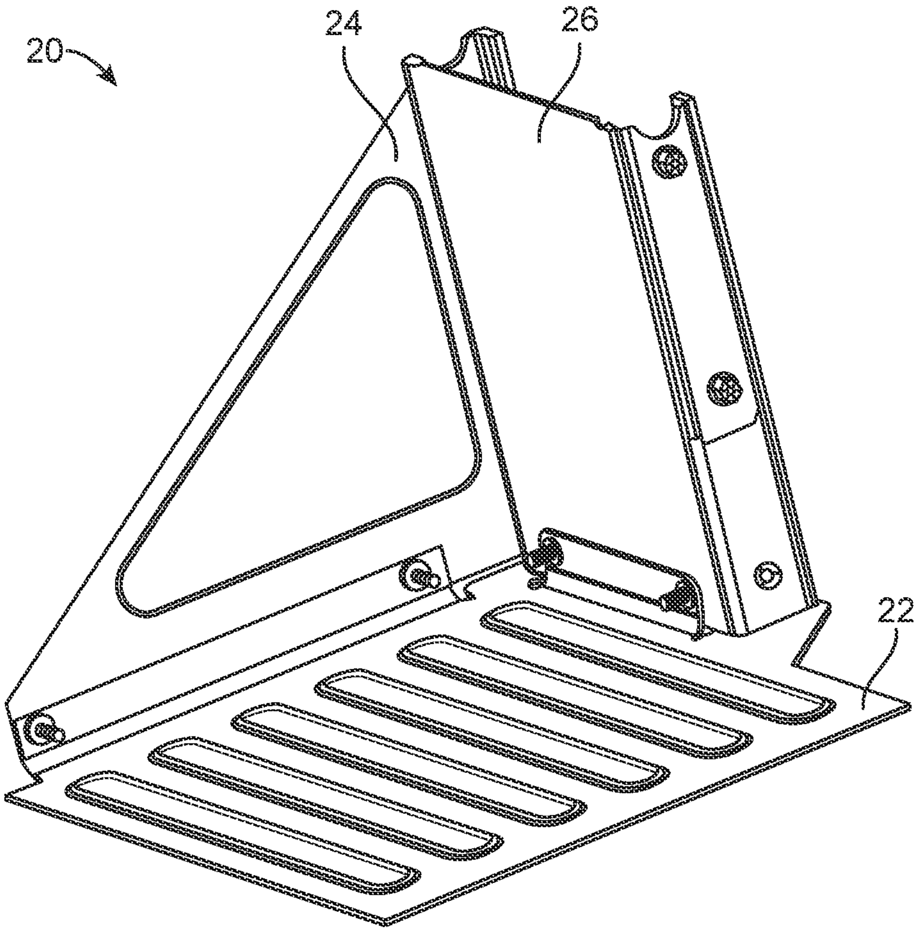
Figure 3C:
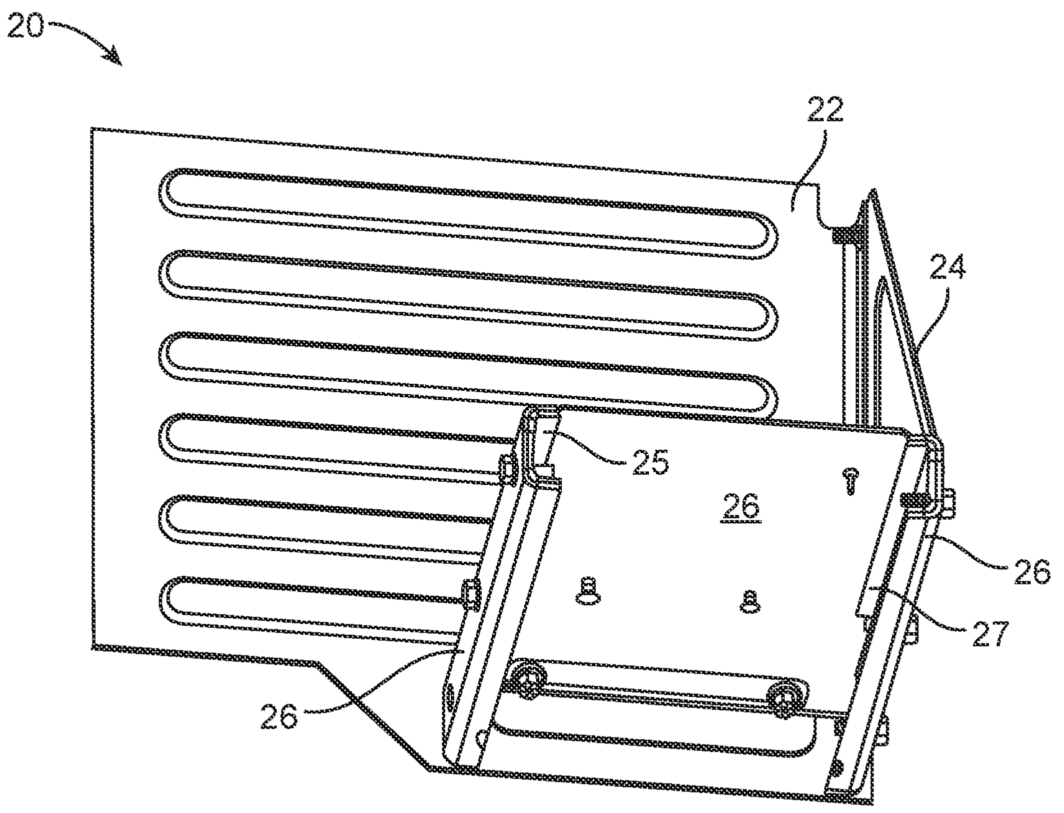

FIGS. 3A-3C show views of the support structure 20 of the spa cover lift 10. As FIGS. 3A-3C show, the support structure 20 includes a base plate 22 formed to slide under a spa 2. The base plate 22 is preferable sized and configured for stability. A gusset plate 24 is connected to the base plate 22. The gusset plate 24 is preferable sized and configured for stability, preferably maintaining structural integrity between the base plate 22 and the lifting structure. As shown, the base plate 22 includes flanges for mechanical connection to the gusset plate 24. Although, the base plate 22 and the gusset plate 24 can be integrally connected, connected via welding or other mechanical connections.

An adjuster bracket 26 is preferably coupled to the base plate 22 and the gusset plate 24. As shown, the base plate 22 includes flanges for mechanical connection to the adjuster bracket 26. The gusset plate 24 is preferably mechanically connected to a side of the adjuster bracket 26.

Within sides of the adjuster bracket 26 are first and second slider brackets 25 and 27, respectively. These slider brackets 25 and 27 can be mechanically connected at various points on the adjuster bracket 26, thereby enabling vertical adjustment of the lifting structure 50. For example, as shown in FIGS. 3A-3C, the first and second slider brackets 25 and 27 are connected to the adjuster bracket 26 at a top and middle aperture using mechanical connections. The lower aperture is unused. In various embodiments, the slider brackets 25 and 27 could be connected to the middle and lower aperture. It is contemplated that other embodiments may have any number of apertures for adjusting vertical length.

In various embodiments, the lift 10 may be attached directly to the spa 2. In this embodiment, the base plate 22 and the gusset plate 24 may be excluded from the lift 10. The lift 10 can be directly attached to the spa 2 via various mechanical connections including mechanical connections between the arm frame supports 60 and 62 and the spa 2.

Figure 4A:
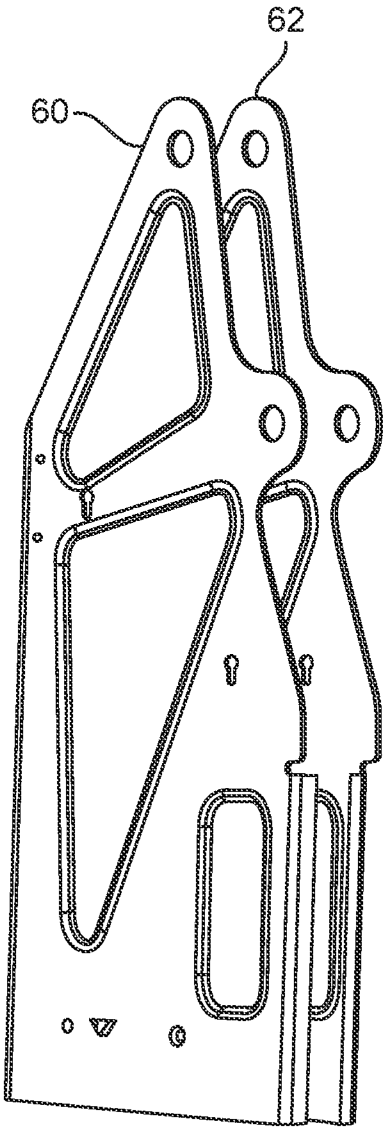
FIG. 4A and 4B show arm frame supports of the lifting structure, in accordance with the present disclosure.
Figure 4B:
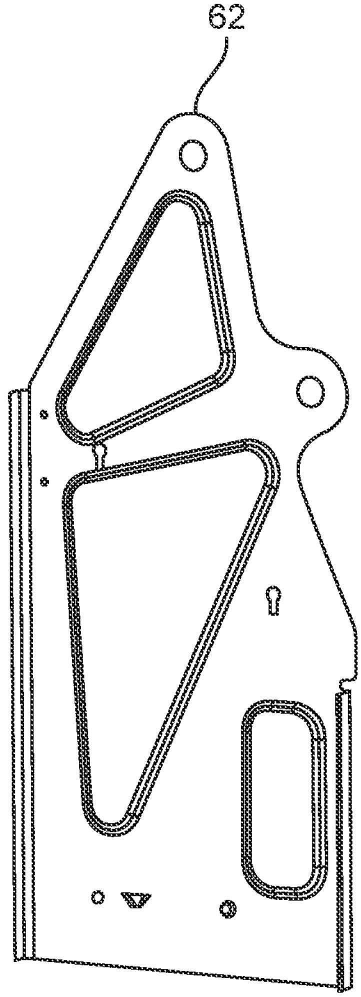

FIG. 4A shows arm frame supports 60 and 62. FIG. 4B shows arm frame support 62. As FIGS. 4A and 4B show, the arm frame supports 60 and 62 are mirror images of one another. The arm frame supports 60 and 62 are preferably mechanically connected to the support structure 20. In one embodiment, the frame supports 60 and 62 are formed of pressed steel. Although, it is contemplated that other materials and manufacturing techniques may be utilized.

In one embodiment, the lifting structure 50 is selectively coupled to the support structure 20, e.g., via portions of the frame supports 60 and 62, using an interference fit connection, i.e., a press fit connection. The frame supports 60 and 62 are preferably press fit between portions of the support structure 20, e.g., via sides of the adjuster bracket 26 and the slider brackets 25 and 27 for further vertical alignment. When configuring height, the slider brackets 25 and 27 may be loosely connected to the adjuster bracket 26. After positioning the frame supports 60 and 62 vertically, mechanical connections may be tightened, pressing the slider brackets 25 and 27 against the frame supports 60 and 62 and pressing the adjuster bracket 26 against the frame supports 60 and 62. Preferably, the interference fit connection is made among parallel portions of brackets of the support structure 20, e.g., sides of the adjuster bracket 26 and the slider brackets 25 and 27, and portions of the lifting structure 50 e.g., frame supports 60 and 62.

Preferably, the slider brackets 25 and 27 and sides of the adjuster bracket 26 are C-shaped. In this way, sides of the frame supports 60 and 62 can have hooked or curved sides to be coupled to portions of the C-shape sides of the slider brackets 25 and 27 and sides of the adjuster bracket 26.

Figure 5A:
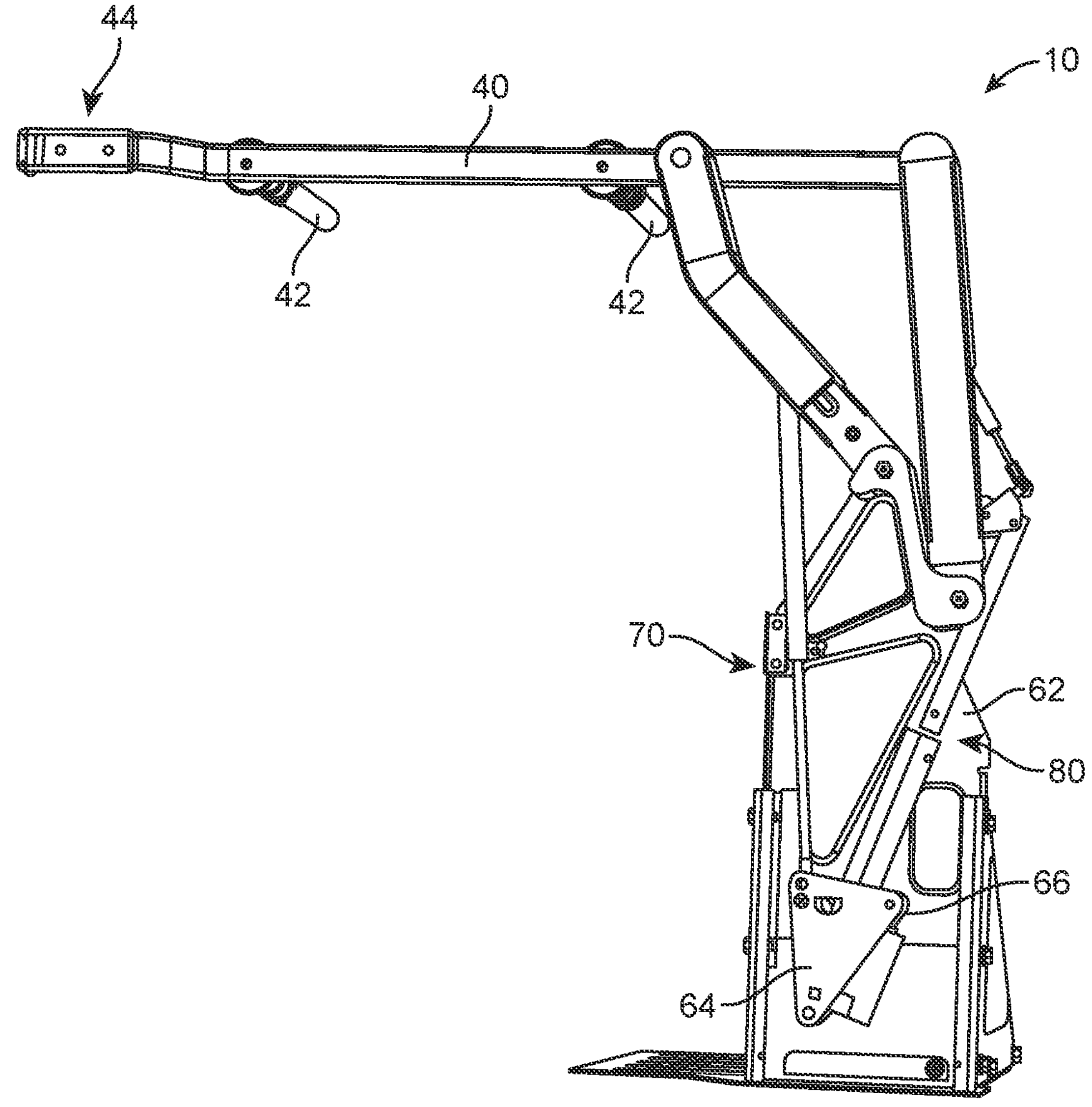
FIGS. 5A and 5B show the exemplary spa cover lift without the housing covers and without arm support frame, in accordance with the present disclosure.
Figure 5B:
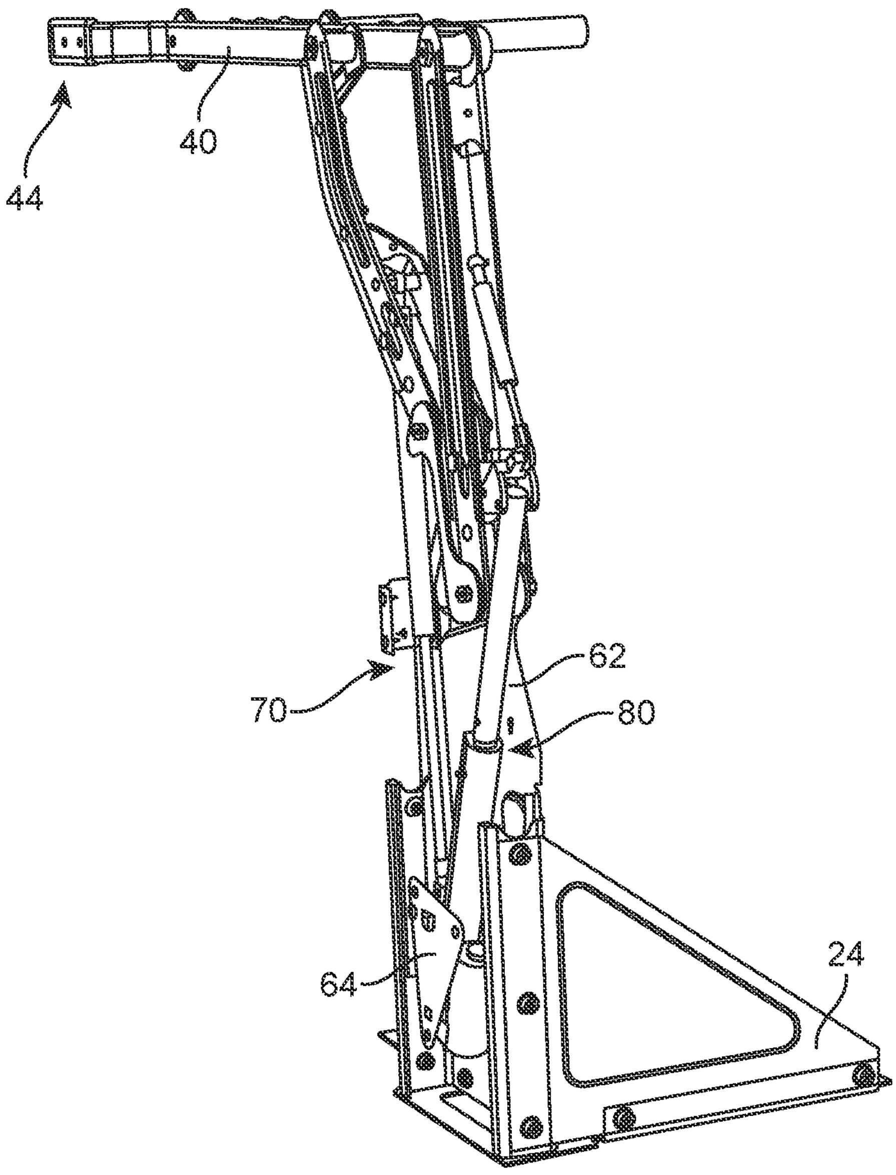

FIGS. 5A and 5B show the exemplary spa cover lift 10 without the housing covers and without arm support frame 60. As FIGS. 5A and 5B show, actuator mount plates 64 and 66 are disposed between the arm frame supports 60 and 62. The actuator mount plates 64 and 66 are shown as triangular-shaped, although any number of shapes may be used. The actuator mount plates 64 and 66 are configured for connection to the arm frame supports 60 and 62 and, in one embodiment, a first and second actuators 70 and 80. The actuator mount plate 64 is preferably mechanically connected to arm frame support 60 and the actuator mount plate 66 is preferably mechanically connected to arm frame support 62. First and second actuators 80 and 90 are preferably mechanically connected to the actuator mount plates 64 and 66, although other connection techniques may be used.

Figure 6A:
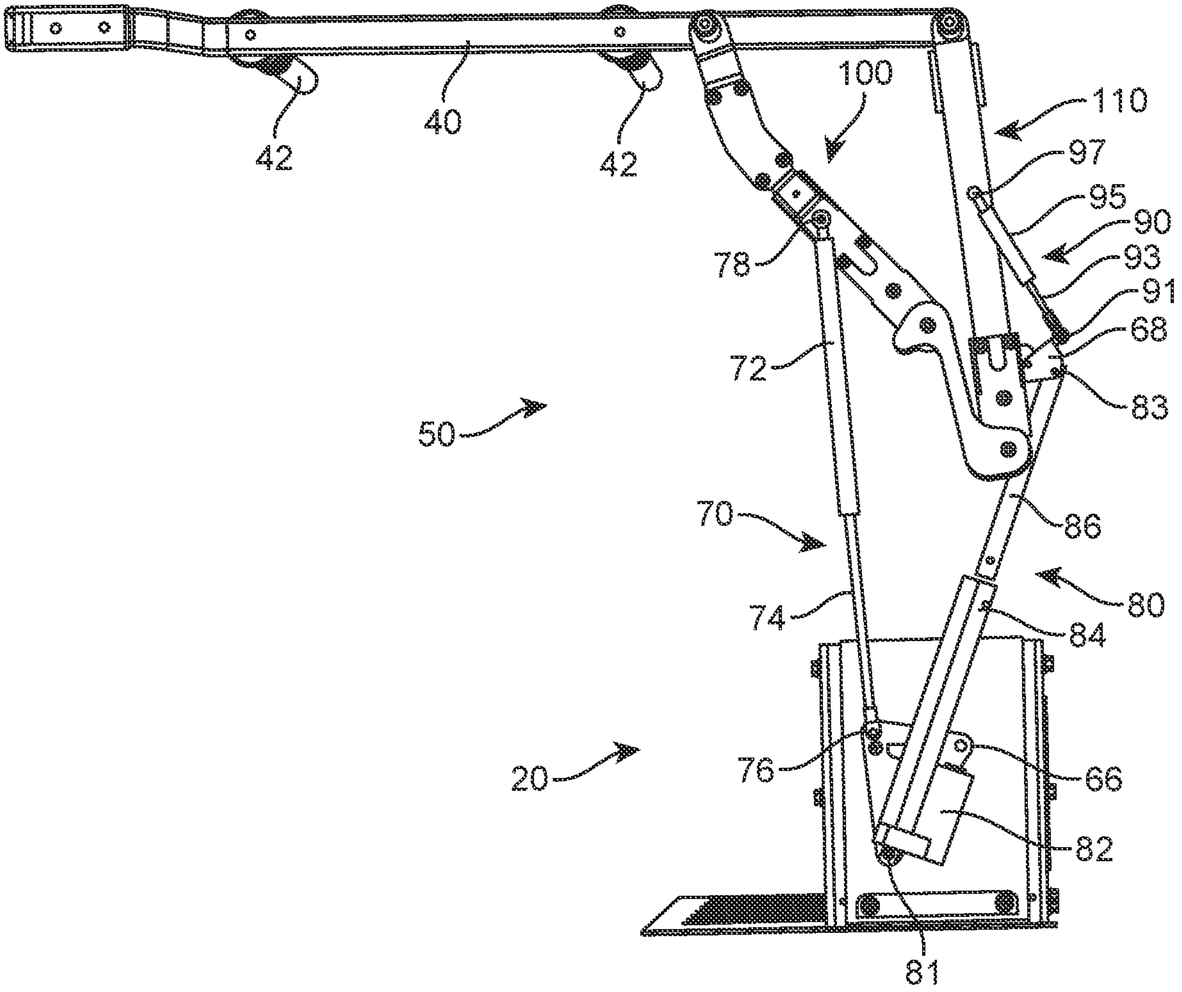
FIGS. 6A and 6B show the lifting structure of the spa cover lift without the housing covers, without the arm support frames, and without the actuator mount plate, in accordance with the present disclosure.
Figure 6B:
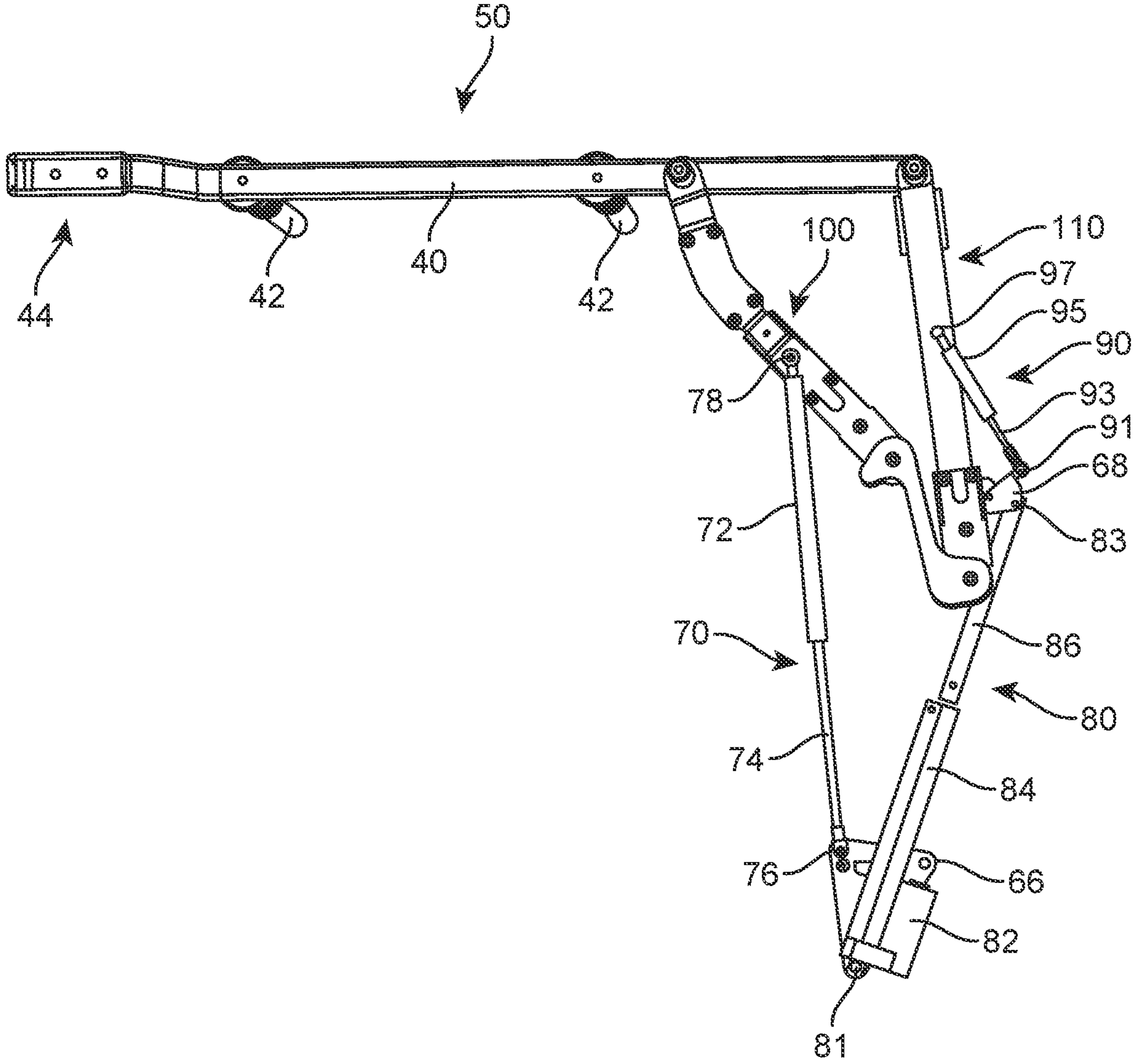

FIGS. 6A and 6B show the lifting structure 50 of the spa cover lift 10 without the housing covers, without the arm support frames 60 and 62, and without the actuator mount plate 64. Portions of the arms 100 and 110 are also omitted to better show where the actuators 70 and 90 connect to the arms 100 and 110, respectively. As FIG. 6A shows, the lifting structure 50 is connected to the support structure 20. FIG. 6B shows the lifting structure 50 of FIG. 6A without the support structure 20.

In one embodiment, the lifting structure 50 includes a handle 40, arms 100 and 110, and actuators 70, 80, and 90. The first actuator 70 is pivotally connected to the first arm 100 at end 78 and one or both of the actuator mount plates 64 and 66 at end 76. The second actuator 80, is pivotally connected to one or both of the actuator mount plates 64 and 66 at end 81 and pivotally connected to a rotating knuckle plate 68 at end 83. The third actuator 90, is pivotally connected to the rotating knuckle plate 68 at end 91 and pivotally connected to the second arm 110 at end 97. Ends of the actuators 70, 80, and 90 may be one or more of a hinge, ball joint, and/or any type of connection to provide support to the actuators and for pivotally moving the actuators 70, 80, and 90. In one embodiment, the ends of the actuators 70, 80, and 90 include an aperture configured to receive a bolt or pin member so that the actuators 70, 80, and 90 can rotate about the bolt or pin member.

The first actuator 70 is preferably a gas spring configured to function as a damper when the spa cover lift 10 transitions to a covered position, and functions as a spring when the spa lift transitions to a stored position. In this way, the spa cover does not come down too fast when removing the spa cover for storage, and a user receives physical assistance when lifting the spa cover up from the stored position to cover the spa back up when not in use.

The first actuator 70 is preferably formed of a piston rod 74 and a receiving cylinder 72. The first actuator 70 can be a mechanical actuator, e.g., a spring, a pneumatic actuator, e.g., a gas spring, a hydraulic actuator or any/or any other type of actuator suitable for providing a spring during lift and a dampener during storage.

The second actuator 80, is preferably an electro-mechanical actuator powered by an electric motor 82, although electro-pneumatic or electro-hydraulic configurations may be used. The second actuator 80 includes a piston rod 86 and a receiving cylinder 84. The motor 82 is configured to selectively supply pressure within the second actuator 80. When pressure is supplied, the second actuator 80 transitions from a “stored state” such as shown in FIG. 1B to a “covered state” such as shown in FIG. 1A. In one embodiment, the second actuator 80 functions as a dampener when transitioning from the “covered state” to the “stored state.”

The third actuator 90 is preferably formed of a piston rod 93 and a receiving cylinder 95. The third actuator 90 can be a mechanical actuator, e.g., a spring, a pneumatic actuator, e.g., a gas spring, a hydraulic actuator or any/or any other type of actuator suitable for providing a spring during lift and a dampener during storage. In one embodiment, the third actuator 90 is configured to function as a damper during transitions.

The rotating knuckle plate 68 is preferably pivotally connected to the arm 110. The rotating knuckle plate 68 is configured for connection to the second actuator 80 and the third actuator 90. The second actuator 80 is connected to the rotating knuckle plate 68 at end 83 and the third actuator 90 is connected to the rotating knuckle plate 68 at end 91. The rotating knuckle plate 68 pivots on the arm 110 during transitions between the “covered state” and the “stored state.”

Figure 7A:
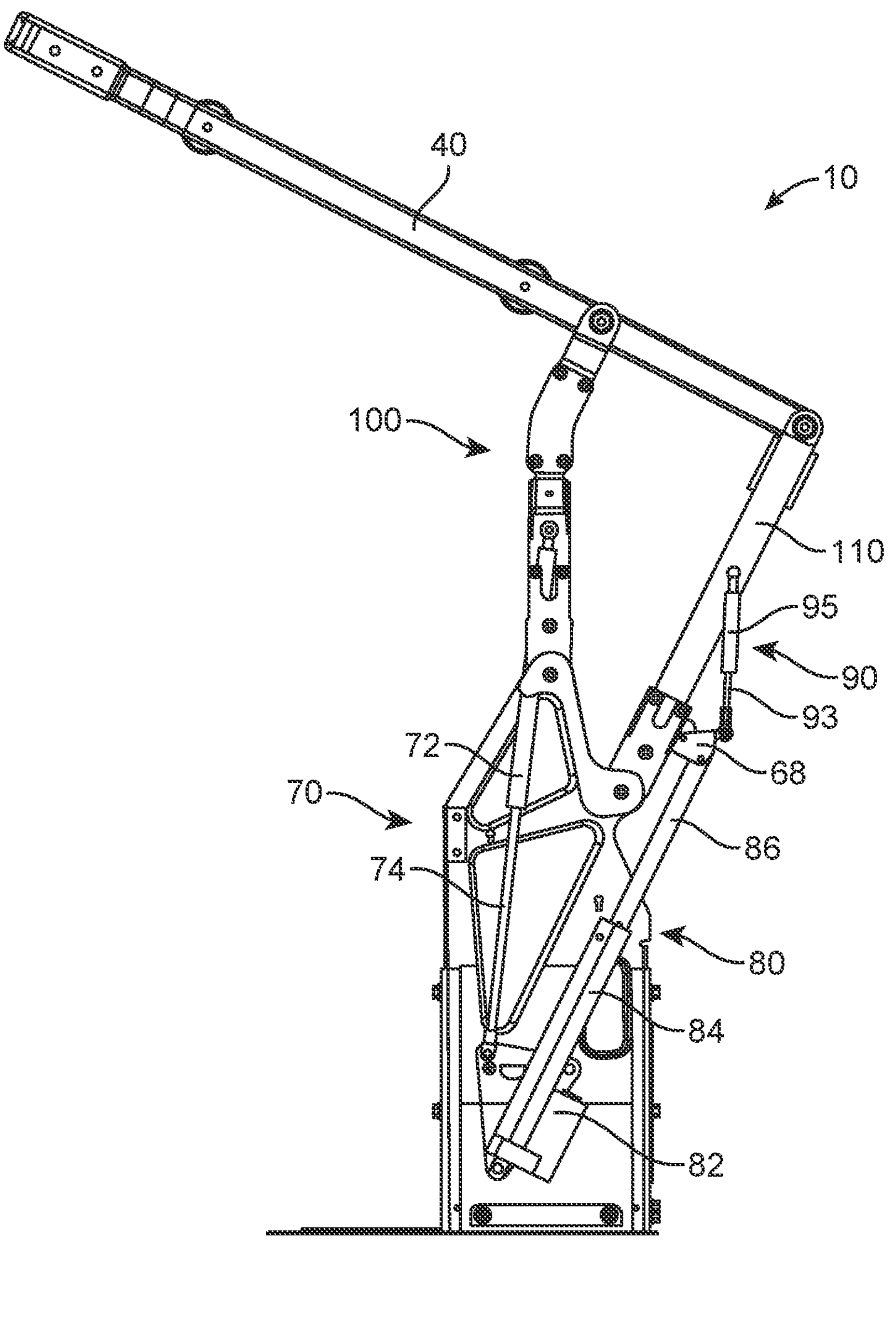
FIGS. 7A-7B show the exemplary spa cover lift in exemplary positions between the "covered state" and the "stored state", in accordance with the present disclosure.
Figure 7B:
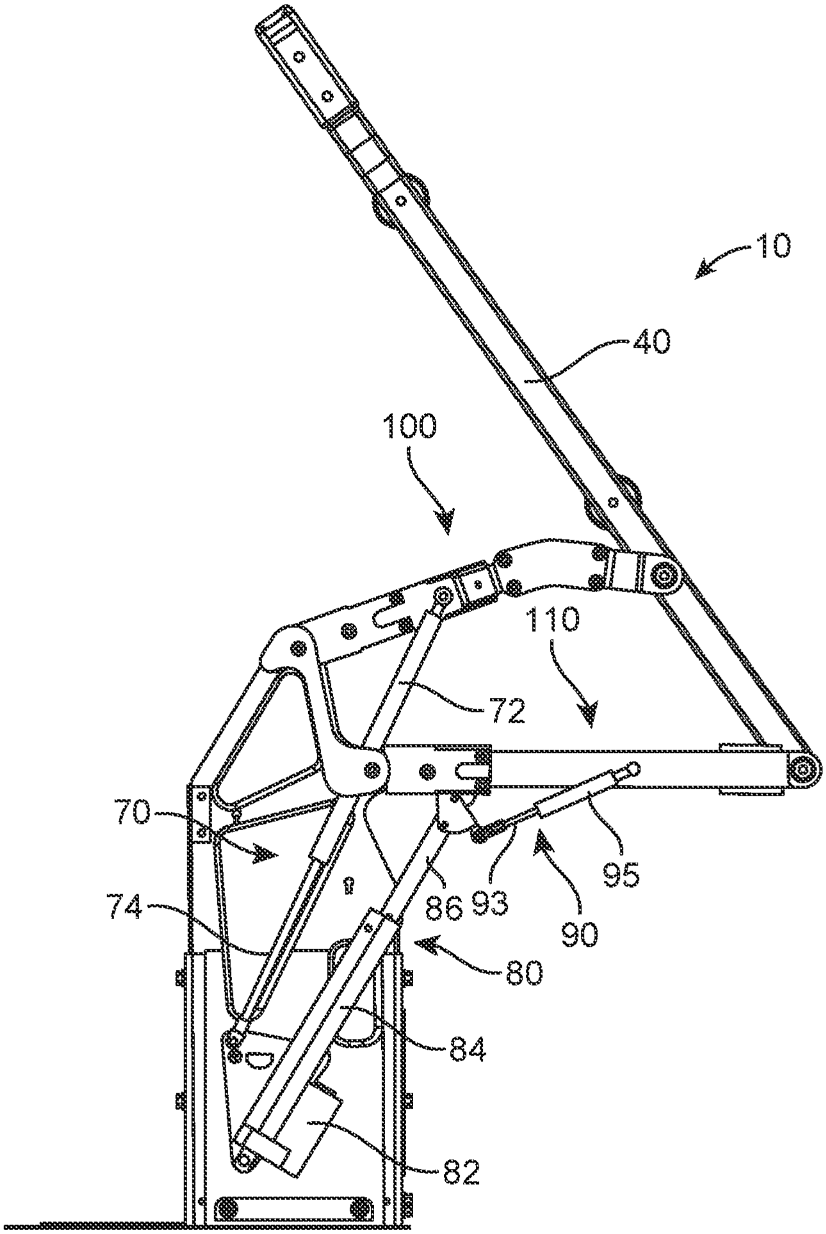
Figure 7C:
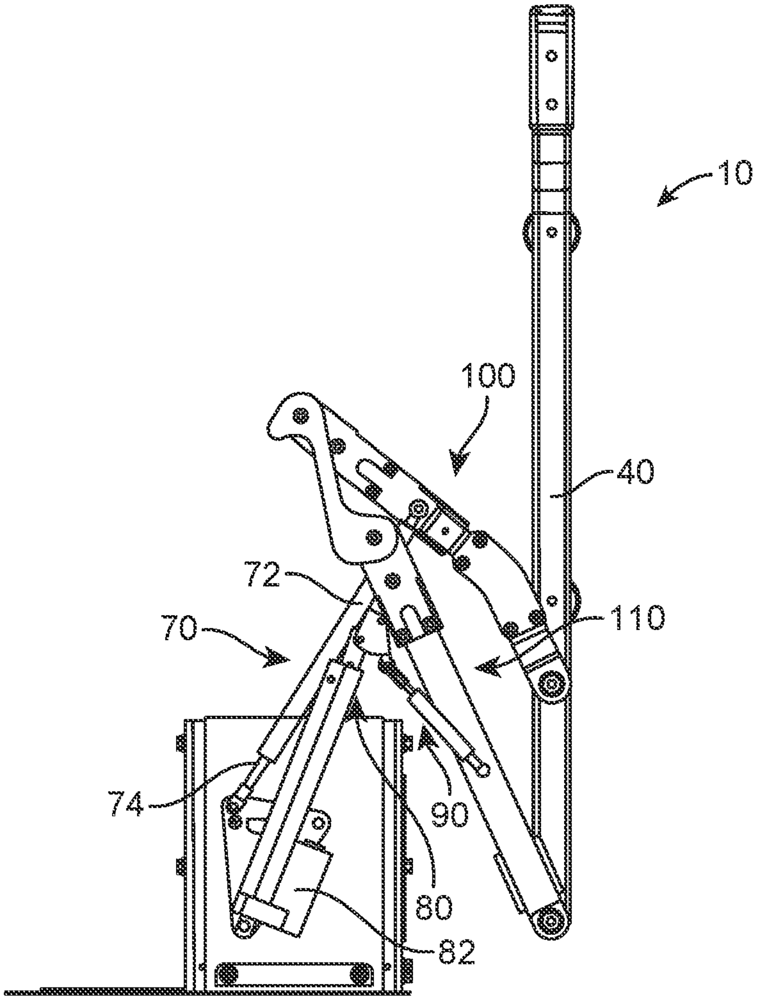
FIG. 7C shows the spa cover lift at the "stored state", in accordance with the present disclosure.

As described hereinabove, FIG. 6A shows the spa cover lift 10 at an exemplary “covered state.” FIGS. 7A-7B show the exemplary spa cover lift 10 in exemplary positions between the “covered state” and the “stored state”; and FIG. 7C shows the spa cover lift 10 at the “stored state.” FIGS. 7A-7C show the spa cover lift 10 without the housing covers, without the arm support frames 60 and 62, and without the actuator mount plate 64. Portions of the arms 100 and 110 are also omitted to better show functions of the actuators 70, 80, and 90 during transitions from the “covered state” to the “stored state.”

During transition from the “covered state” to the “stored state”, the lifting arm 40 is moved from a substantially horizontal position to a substantially vertical one. The arrangement of the actuators 70, 80, and 90, and the arms 100 and 110, causes the lift arm 40 to rotate during transitions between the “covered state” and the “stored state.” During the transition the motor 82 draws the piston rod 86 into the receiving cylinder 84. The piston rod 86 pulls the rotating knuckle plate 68 downward. Mechanical energy from the motor 82 is communicated through the third actuator 90 to the arm 110, the lift arm 40, the arm 100, and then the first actuator 70.

During transition from the “covered state” to the “stored state”, the third actuator 90 compresses, whereby the piston rod 93 goes into the receiving cylinder 95. The third actuator 90 functions as a dampener, slowing rotation of the arm 110. In one embodiment, the third actuator 90 begins dampening after the arm 110 is 90-degrees rotated relative to its position in the “covered state.” In one embodiment, the third actuator 90 begins dampening after the lifting arm 40 is about 45-degrees rotated relative to its position in the “covered state.” In one embodiment, the third actuator 90 begins dampening after the lifting arm 40 is half-rotated between the “covered state” to the “stored state.”

During transition from the “covered state” to the “stored state”, the first actuator 70 compresses, whereby the piston rod 74 goes into the receiving cylinder 72. The first actuator 70 functions as a dampener, slowing rotation of the arm 110. In one embodiment, the first actuator 70 begins dampening after the arm 100 is 90-degrees rotated relative to its position in the “covered state.” In one embodiment, the first actuator 70 begins dampening after the lifting arm 40 is about 45-degrees rotated relative to its position in the “covered state.” In one embodiment, the first actuator 70 begins dampening after the lifting arm 40 is half-rotated between the “covered state” to the “stored state.”

During transition from the “stored state” to the “covered state”, stored energy in the actuators 70, 80, and 90 may be used to lift and rotate the lifting arm 40 and the coupled spa cover 4. In one embodiment, only the first actuator 70 functions as a spring during the transition from the “stored state” to the “covered state.” The transition from the “stored state” to the “covered state” may be aided by the motor 82 increasing pressure within the receiving cylinder 84, thereby moving the piston rod 86 out. The piston rod 86 pushes the rotating knuckle plate 68, which causes the third actuator 90 to move the arm 110. Mechanical energy from the motor 82 is further communicated to the lift arm 40. In one embodiment, concurrent with the motor imparting force to the lifting arm 40, the first actuator 70, functioning as a spring, communicates mechanical energy to the arm 100, which causes the lifting arm 40 to move and rotate.

During transition from the “stored state” to the “covered state”, the first actuator 70 decompresses, whereby the piston rod 74 goes out of the receiving cylinder 72. The first actuator 70 functions as a spring, aiding rotation of the arm 100. In one embodiment, mechanical energy from the first actuator 70 is communicated to the arm 100 until the arm 100 begins rotating downward. In one embodiment, mechanical energy from the first actuator 70 is communicated to the lifting arm 40 until the lifting arm 40 is about 45-degrees rotated relative to its position in the “stored state.”

Figure 8A:
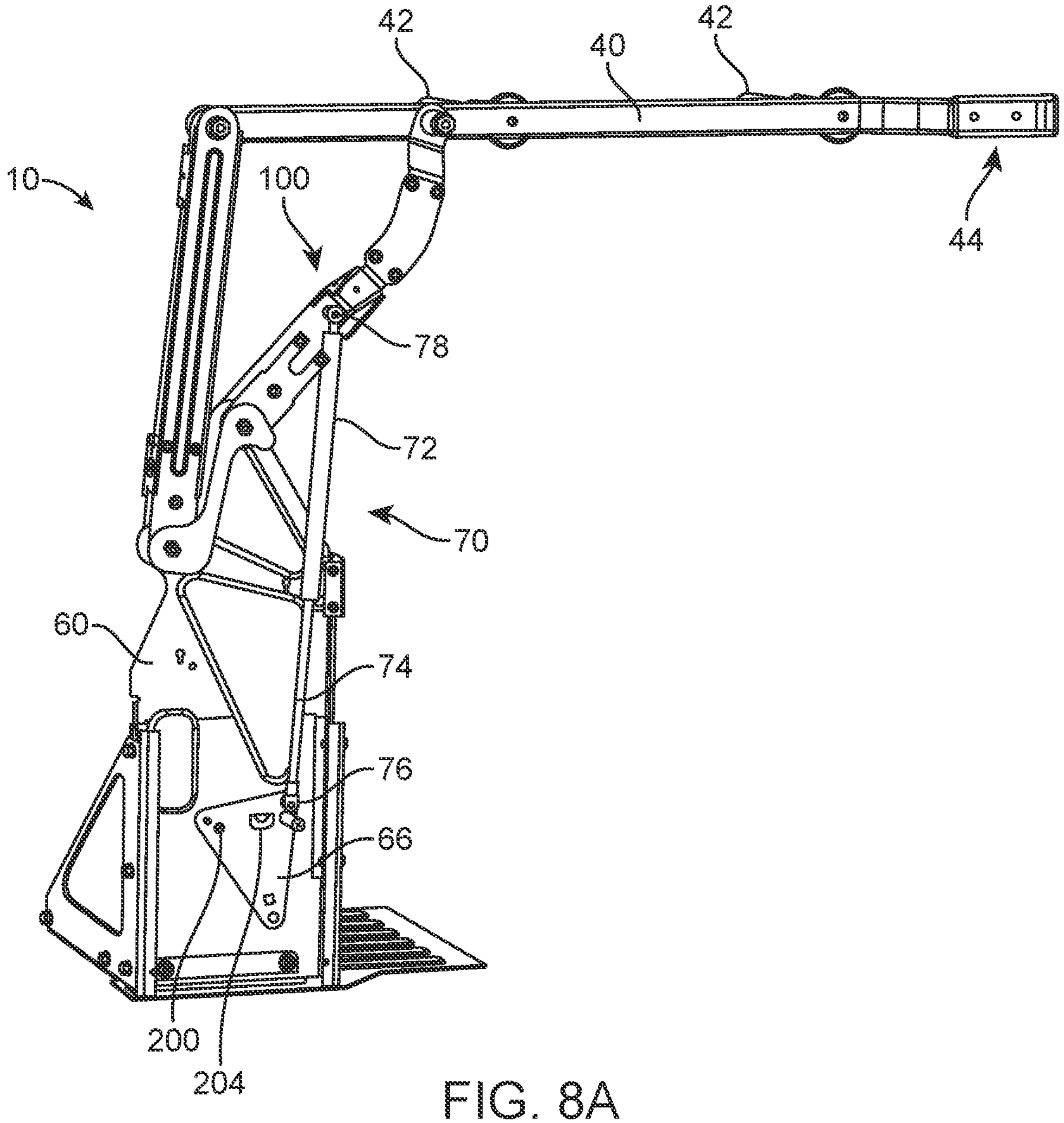
FIGS. 8A-8E shows an embodiment of the spa cover lift, in accordance with the present disclosure.
Figure 8B:
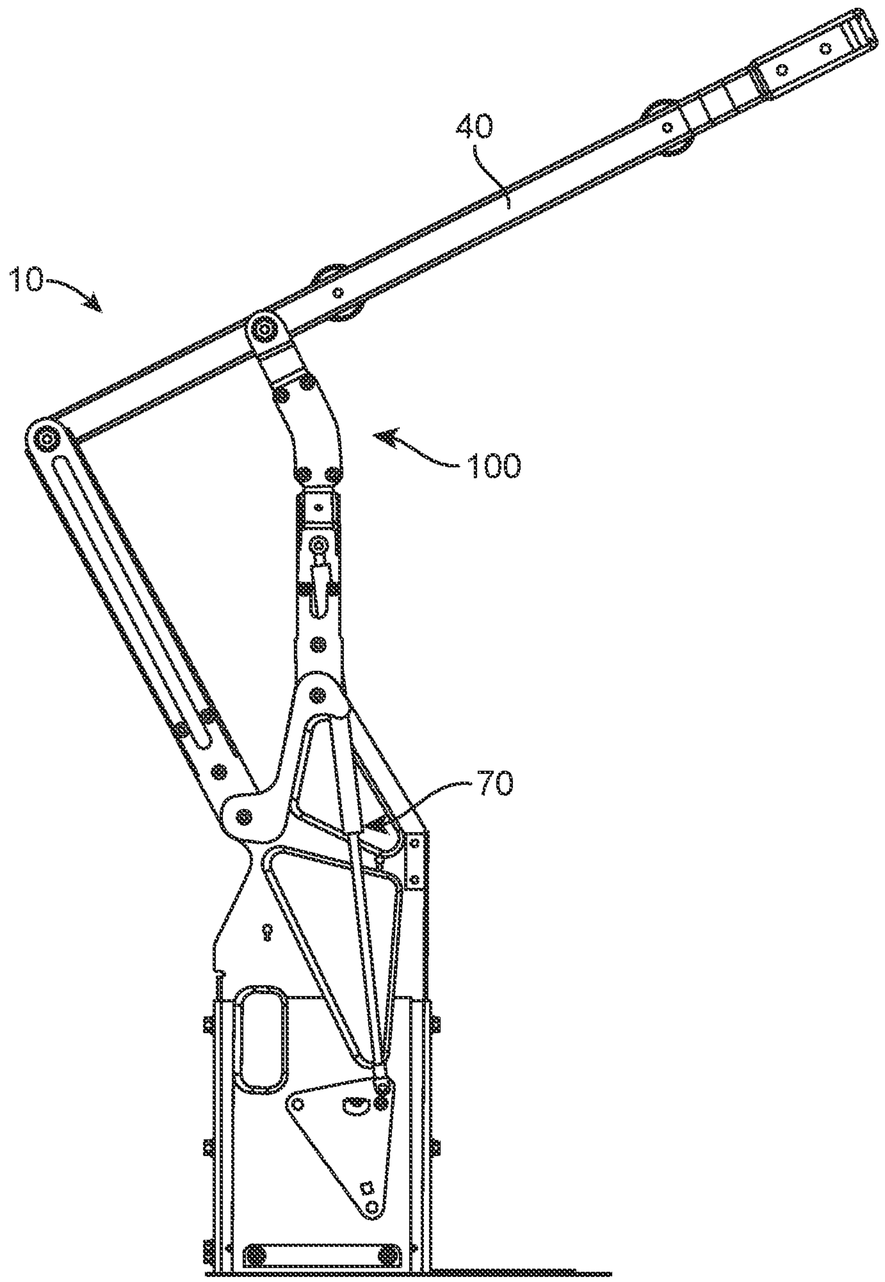
Figure 8C:
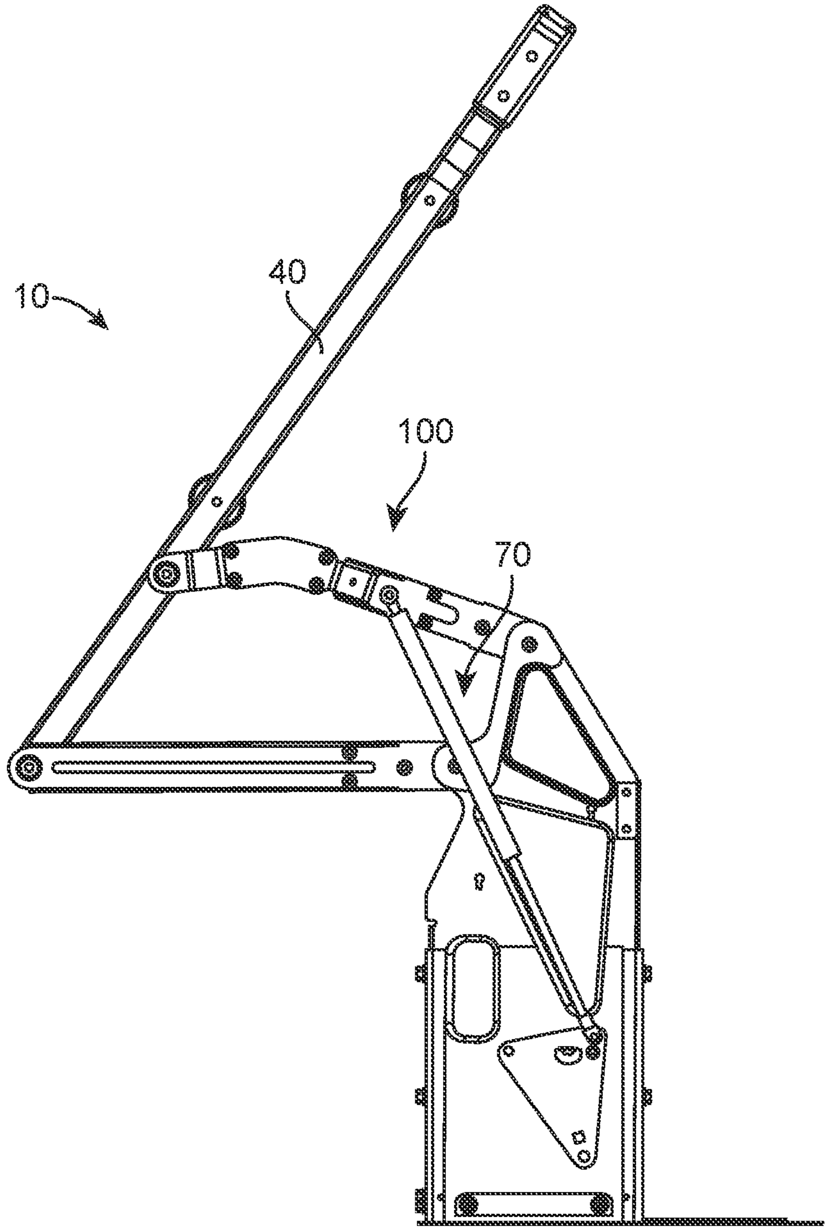
Figure 8D:
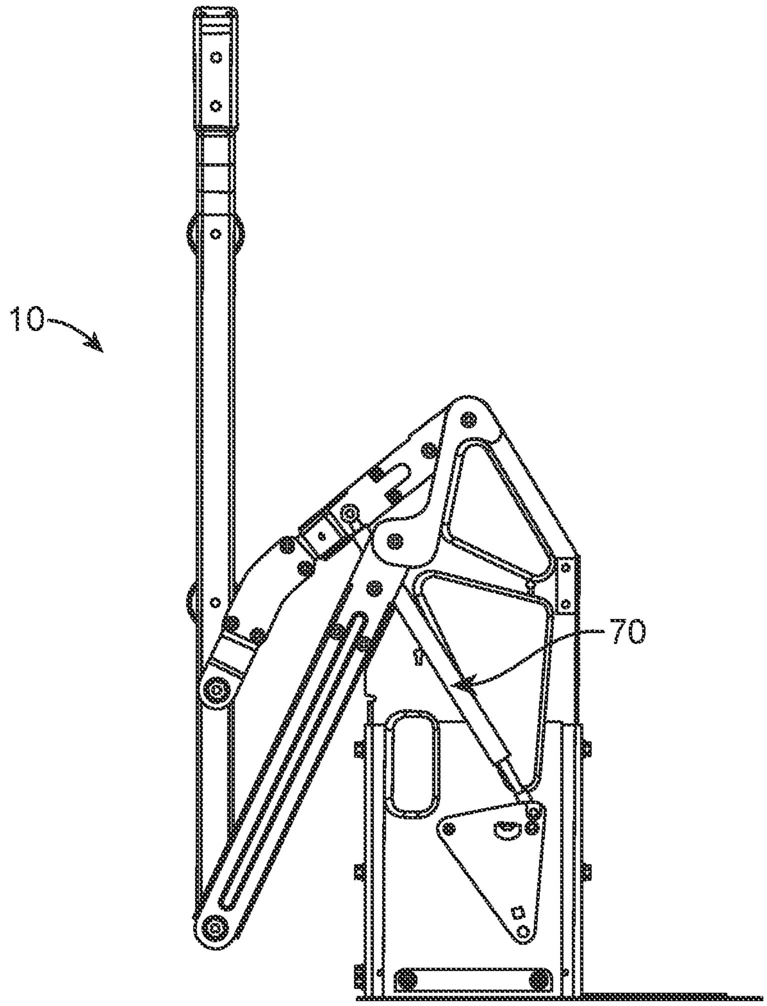
Figure 8E:
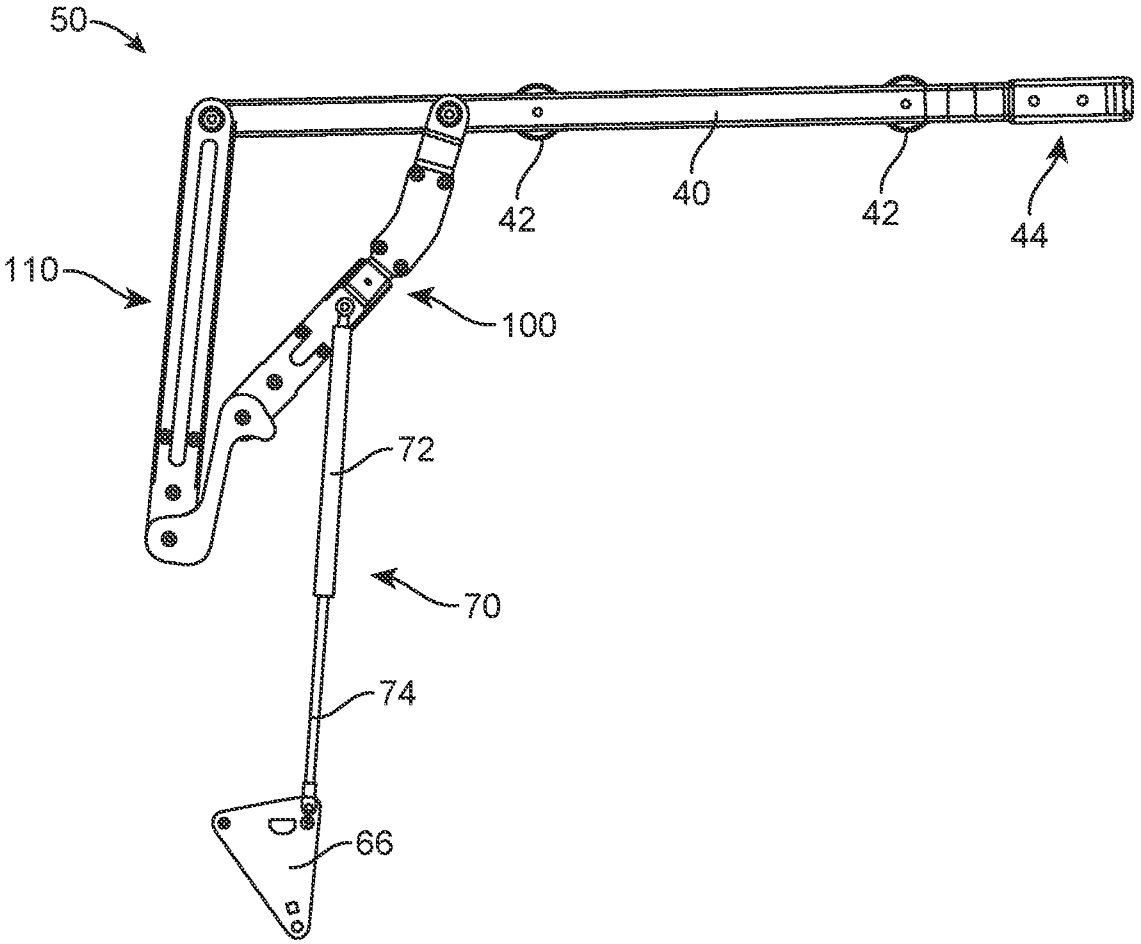

FIGS. 8A-8E show an embodiment of the spa cover lift 10 configured for manual operation by a user without the aid of an electronic motor. FIG. 8E shows the lifting structure 50 of FIGS. 8A-8D without the support structure 20 for ease of description. As FIGS. 8A-8E show, the spa cover lift 10 includes a single actuator 70 coupled to the arm 100. In this embodiment, the actuator 70 is configured to function as a dampener when transitioning from the "covered state" such as shown in FIG. 8A to the "stored state" such as shown in FIG. 8D. In one embodiment, the actuator 70 is configured to function as a dampener when the arm 100 begins rotating downward. In one embodiment, the actuator 70 is configured to function as a dampener when the lifting arm 40 begins rotating downward, e.g., when the lifting arm 40 is 45-degrees rotated relative to its position in the "stored state."

The actuator 70 then functions as a spring, communicating stored energy, when the user initiates lifting of the spa cover 4 from the "stored state" to the "covered state." In one embodiment, the actuator 70 communicates energy until the arm 100 begins rotating downward. In one embodiment, the actuator 70 is configured to function as a spring when the lifting arm 40 begins rotating downward, e.g., when the lifting arm 40 is 45-degrees rotated relative to its position in the "covered state."

Figure 9:
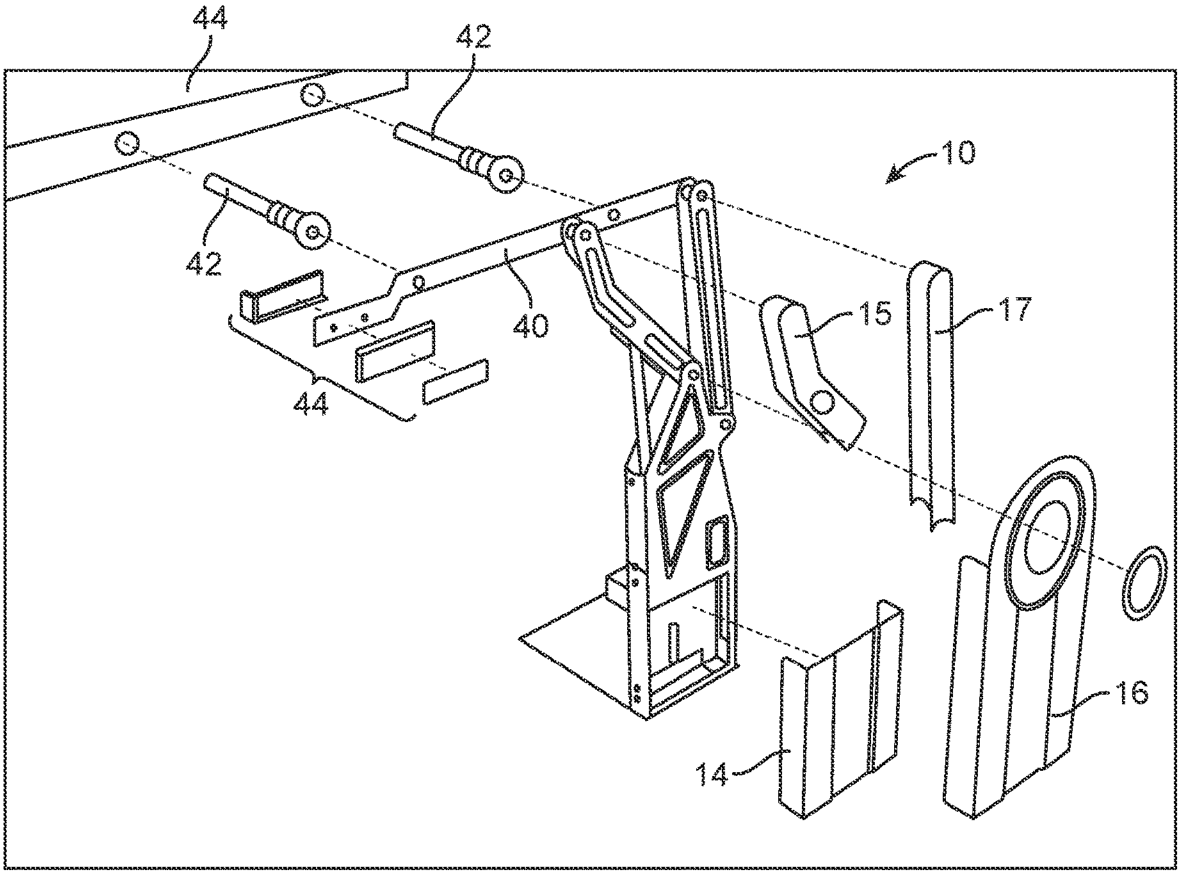
FIG. 9 shows a partially exploded view of the spa cover lift, in accordance with the present disclosure.

FIG. 9 shows a partially exploded view of the spa cover lift 10 illustrating cover and protective elements and auger placement into the spa cover 4. As FIG. 9 shows, the spa cover lift 10 includes a plurality of covers including a handle gripping cover 44, a lower base cover 14, an upper cover 16, and arm covers 15 and 17. In one embodiment, the upper cover 16 is fitted partially overlapping the lower base cover 14. In this way, vertical adjustment of the spa cover lift 10 will not necessitate different covers or housing elements. In one embodiment, the handle 44 and the covers 14-17 are snap or press fit into elements of the spa cover lift 10, but it is contemplated that other attachment techniques may be used, e.g., mechanical coupling. In one embodiment, the handle 44 and the covers 14-17 are formed of any material suitable for use outdoors, such as steel (e.g., galvanized, stainless, etc.), aluminum, composites, polymers, etc.

Figure 10A:
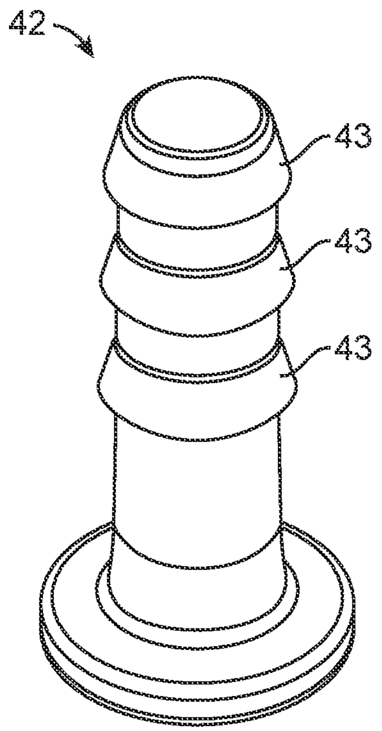
FIG. 10A and 10B show an auger, in accordance with the present disclosure.
Figure 10B:
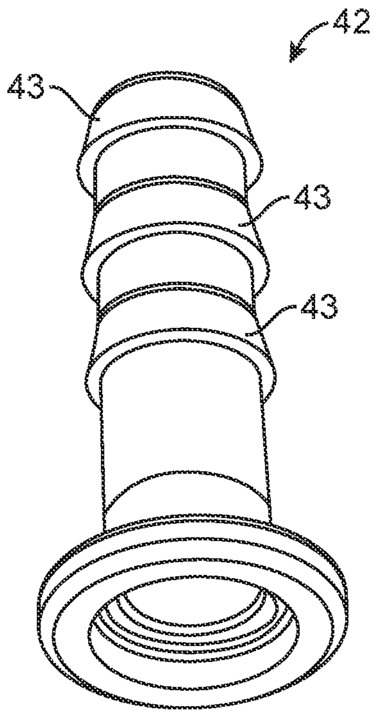

FIG. 10A and 10B show the auger 42. The augers 42 are preferably configured for mechanical coupling to the lift arms 40. In one embodiment, the augers 42 include annular barbs 43 to aid in anchoring the augers 42 within a spa cover 4. In one embodiment, the augers 42 include a partially hollow interior having threads for receiving a mechanical connection, e.g., a bolt for securing the augers to the lift arms 40. The augers 42 can be made of any suitable material, e.g., polymeric material, metal, ceramic, or any other material or combination thereof and is typically more rigid than material within the spa cover 4 in which it is received. In various applications or embodiments of spa covers 4, the augers 42 can be positioned within the cover 4 in various desired positions. In one embodiment, the augers 42 are configured to receive a mechanical element within a hollow interior. In this way, the mechanical element can expand the auger within the spa cover, thereby improving friction fitting therein.

Figure 10C:
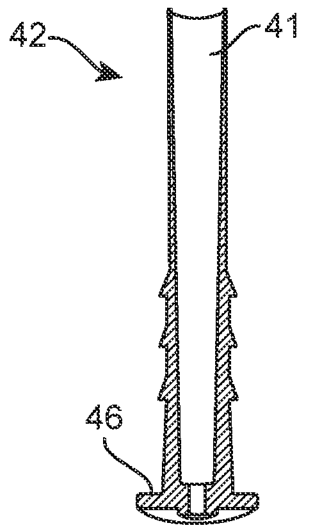
FIG. 10C is a cross-sectional view of an auger, in accordance with the present disclosure.

FIG. 10C shows a cross-sectional view of an auger 42. As FIG. 10C shows, the auger 42 can include a hollow interior 41. The hollow interior 41 can be cylindrical in shape. In one embodiment, the hollow interior 41 can be partially conical in shape and/or have a frustum conical shape. In one embodiment, the auger 42 includes a flanged end 46. The flanged end 46 is configured to abut a surface of the spa cover 4, thereby offering preferential stability when the auger 42 is in tension when the spa cover 4 is lifted or moved over the spa 2 such as when transitioning between a "covered state" and a "stored state."

Figure 10D:
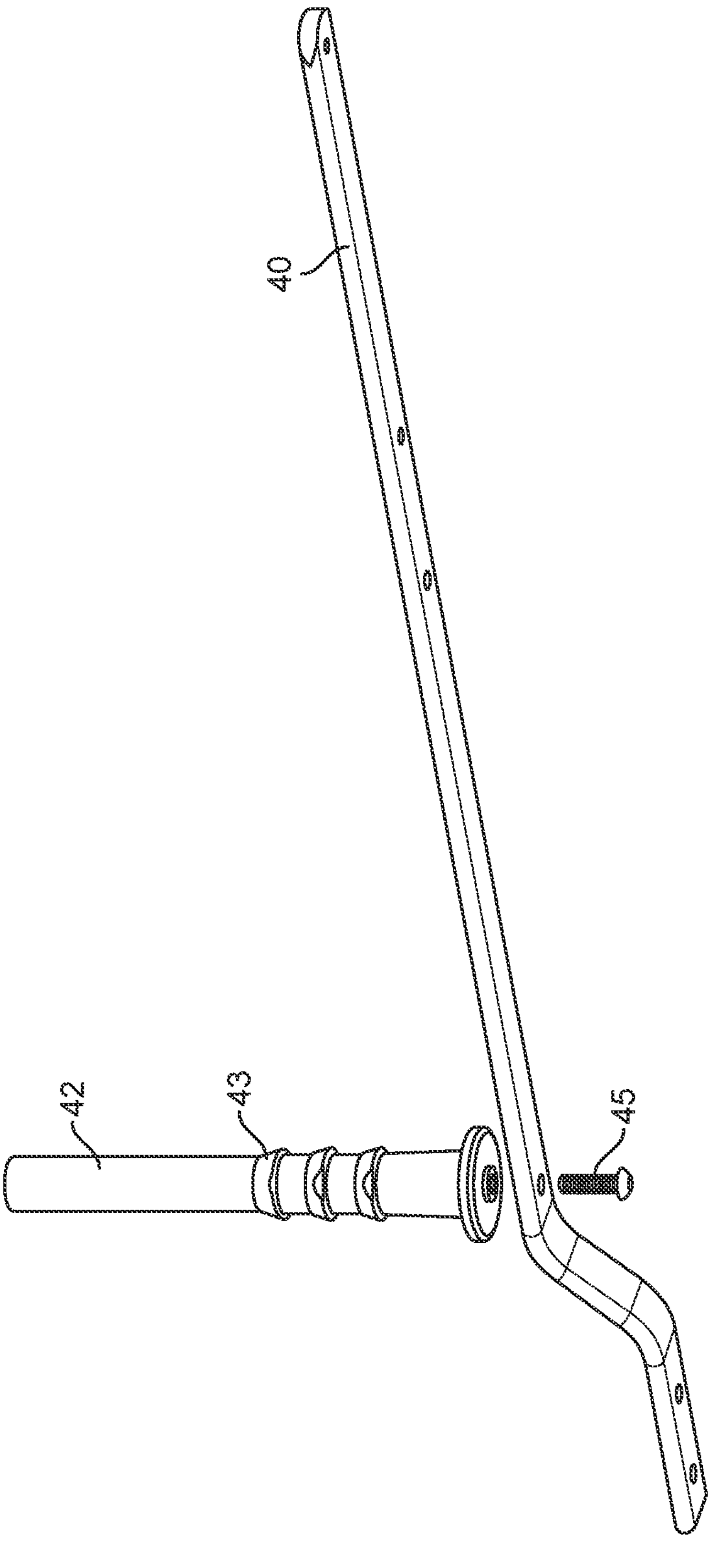
FIG. 10D is an exploded view of the auger and a lift arm, in accordance with the present disclosure.

FIG. 10D is an exploded view of the auger 42 and a lift arm 40. As FIG. 10D shows, a mechanical element 45 may be used to secure the auger 42 to the arm 40. In one embodiment, the mechanical element 45 is a bolt configured to traverse an aperture within the arm 40 and threadably attached to corresponding threads within the auger 42. One skilled in the art will recognize that other attachment elements may be used to secure the auger 42 to the arm.

Figure 10E:
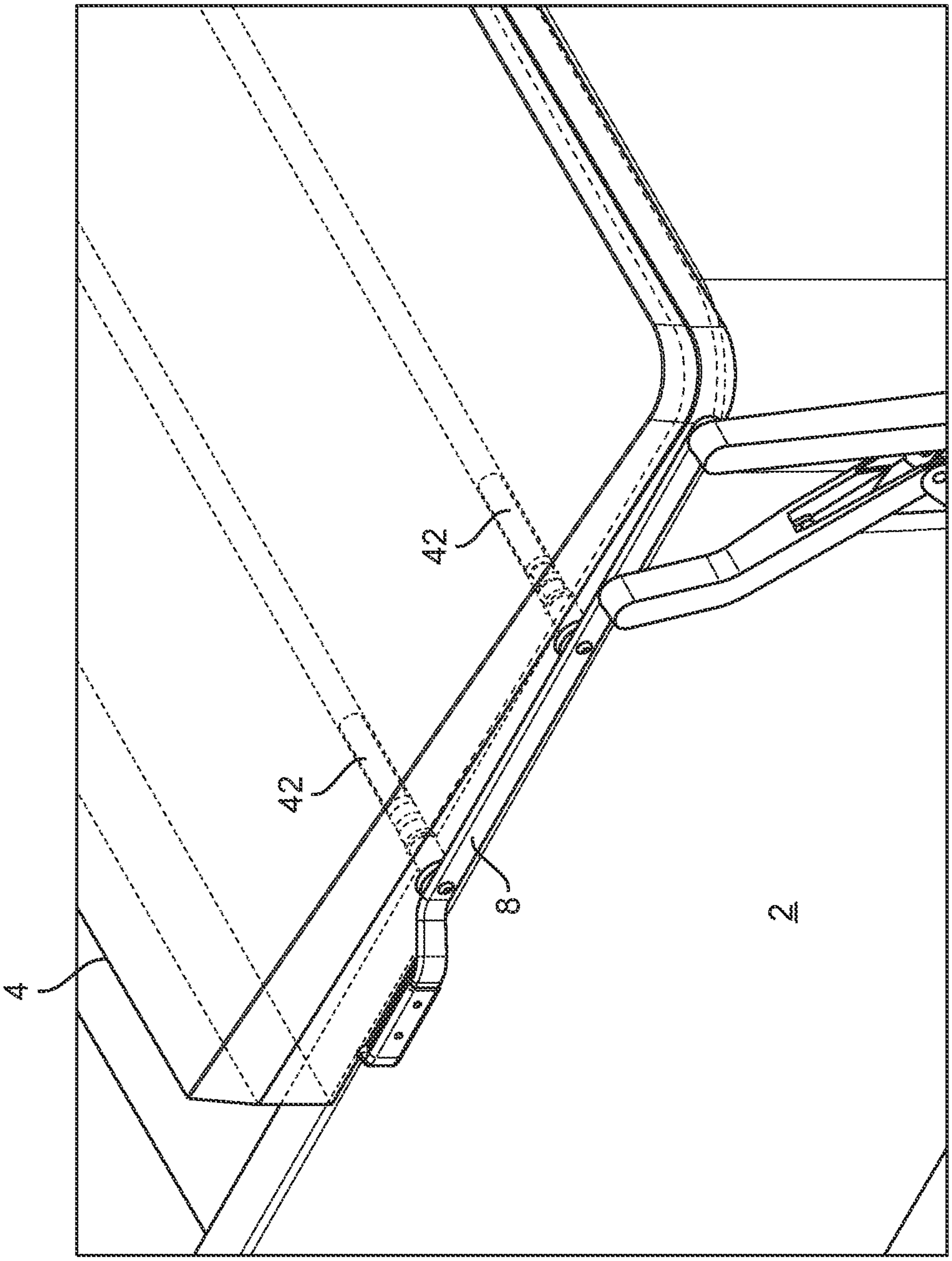
FIG. 10E illustrates augers within the spa cover, in accordance with the present disclosure.
Figure 10F:
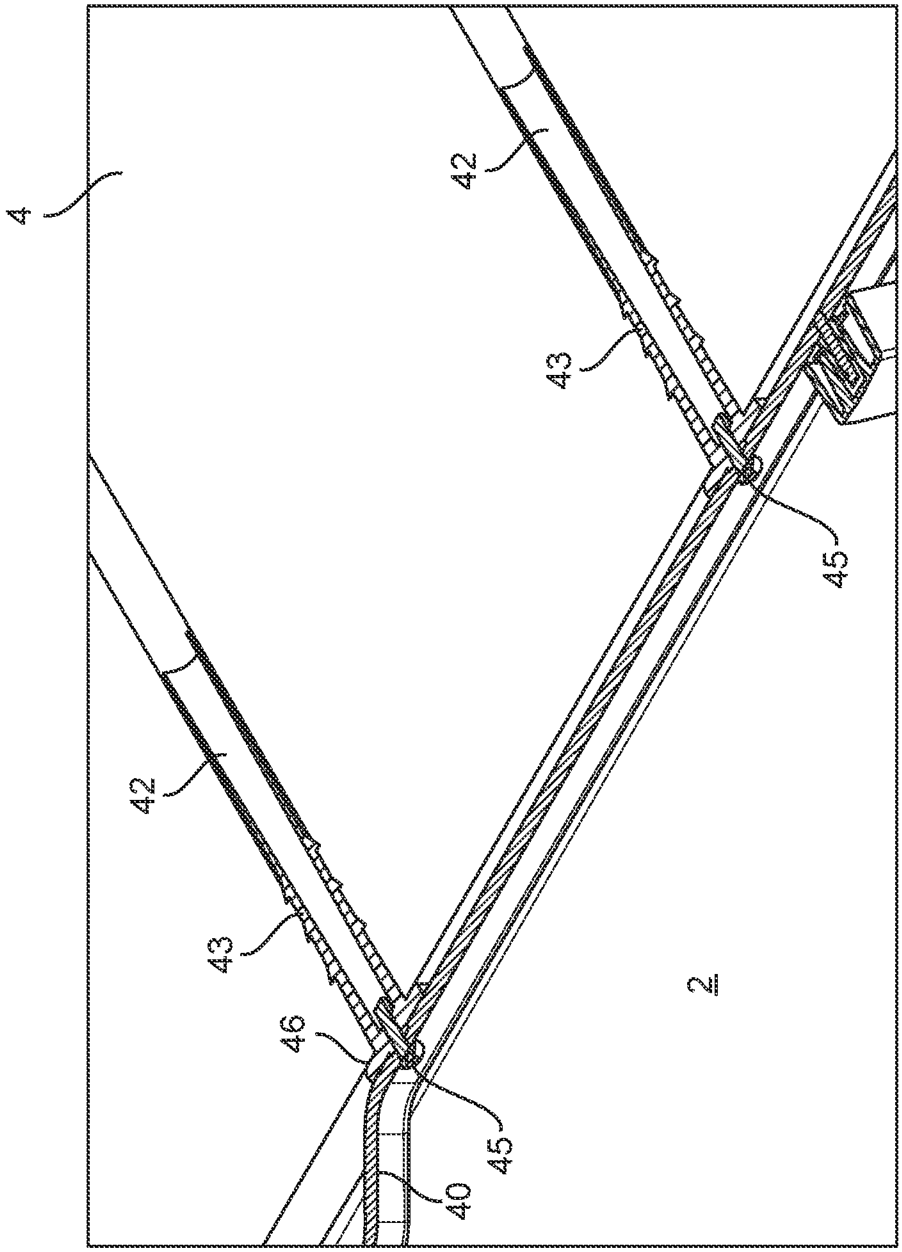
FIG. 10F is a cross-sectional view, illustrating augers within the spa cover, in accordance with the present disclosure.

FIG. 10E shows the augers 42 in phantom within the spa cover 4. FIG. 10F shows the augers 42 and the spa cover 4 in a cross-sectional. As FIGS. 10E and 10F show, the augers 42 are disposed within the spa cover 4 for support and communication of mechanical energy when lifting and moving the spa cover 4 such as between the "covered state" and the "stored state." As FIGS. 10E and 10F show, the augers 42 may be positioned within a bored opening within the spa cover 4. In other embodiments, the augers 42 may be press-fit into the spa cover 4 without drilling or boring of material. The annual barbs 43 engage material of the spa cover 4 to inhibit outward movement of the augers 42, but also shaped for preferential inward movement when securing the augers 42 to the cover 4.

Figure 11A:
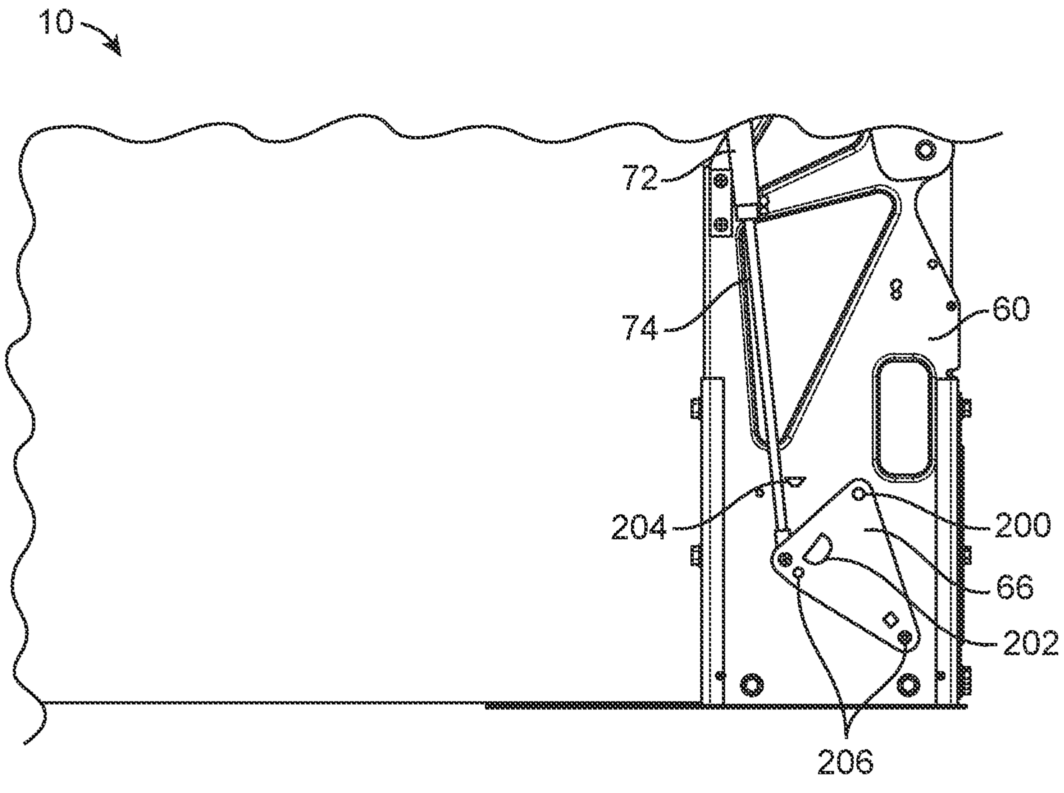
FIGS. 11A-11C are enlarged views of a portion of the spa cover lift, in accordance with the present disclosure.
Figure 11B:
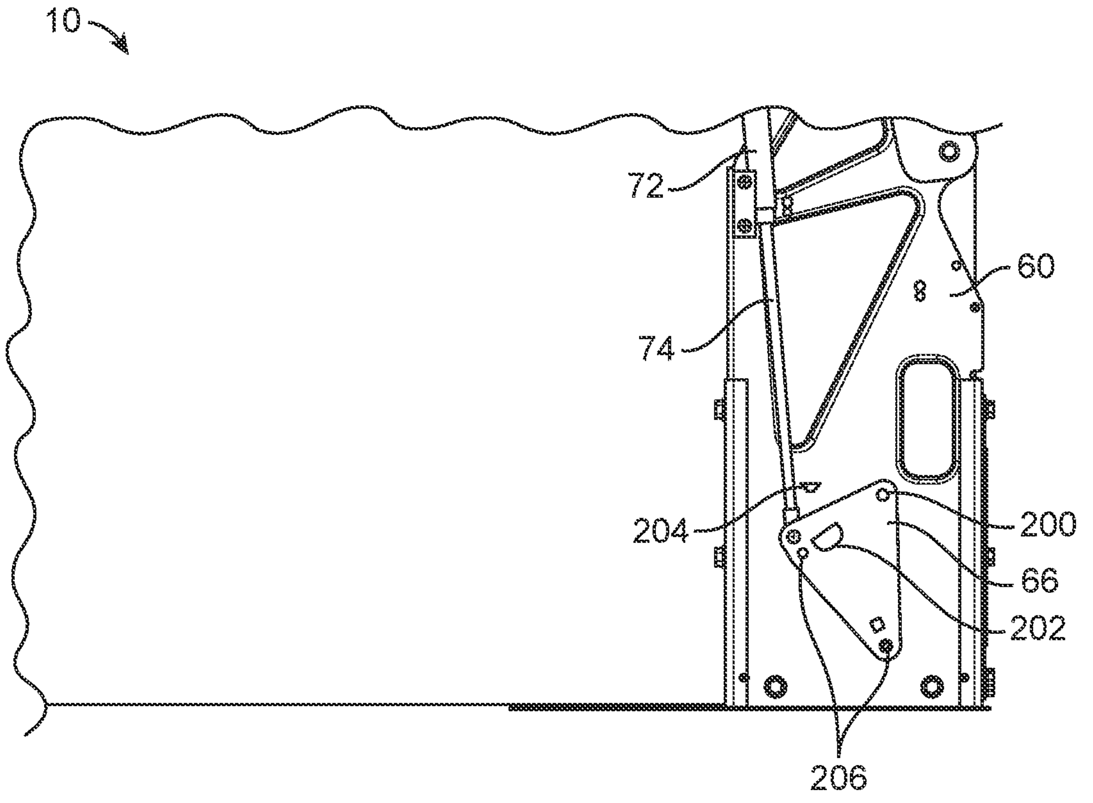
Figure 11C:
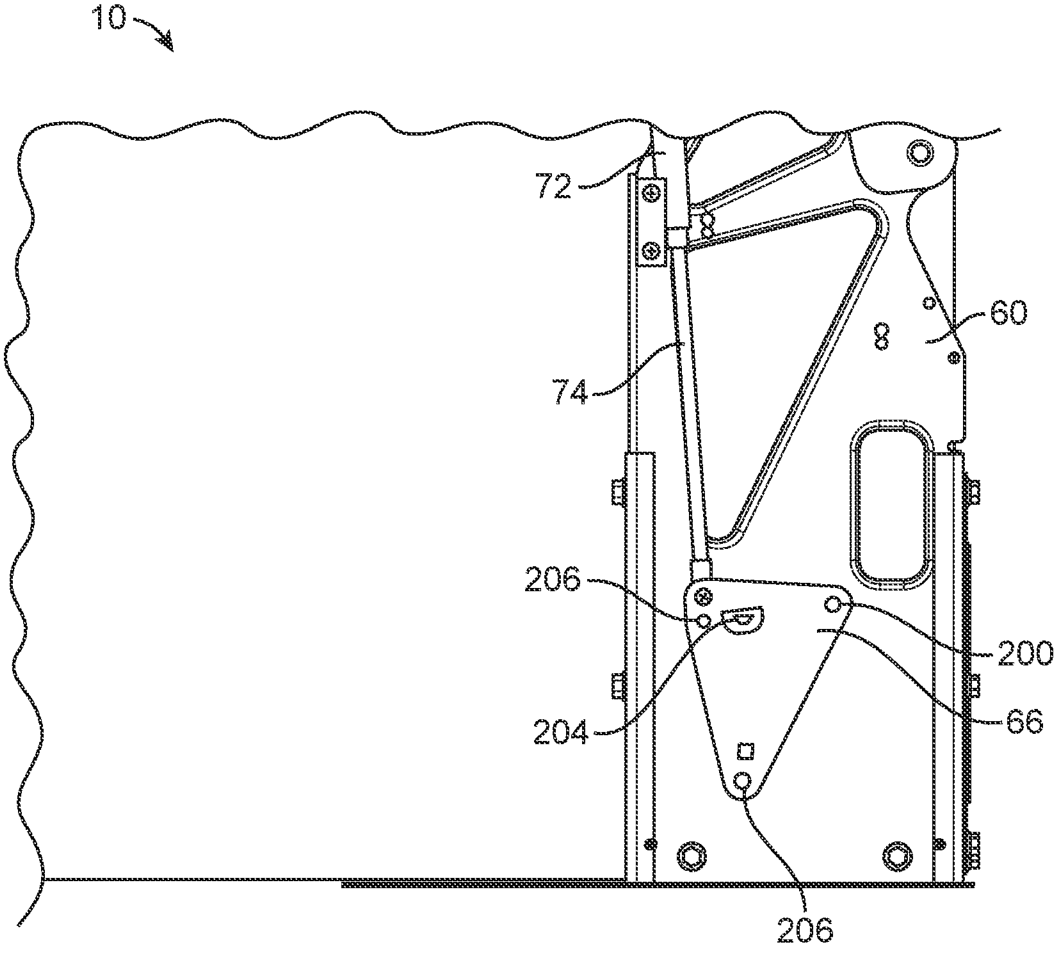

FIGS. 11A-11C are enlarged views of a portion of the spa cover lift 10. Some components of the lift 10 are removed from view for ease of illustration e.g., the actuator mount plates 64. For preferential shipping, the spa lift 10 is shipped with the actuator 70 pre-loaded, i.e., pressurized. Hence for installing, the mount plates 64 and 66 must be pivoted and secured to the frame supports 60 and 62. In one embodiment, the mount plates 64 and 66 pivot about an attached rod 200 or other mechanical element. An opening 202 of the mount plates 64 and 66 can be sized and shaped to engage a tab 204 or other protrusion of the frame supports 60 and 62, when the mount plate 66 is pivoted in place.

FIG. 11A shows an exemplary pivot position of the plate 66. FIG. 11B shows the plate 66 in an intermediate position between shipping position and a secured position. FIG. 11C shows an exemplary secured position of the mount plate 66. As FIG. 11C shows, the mount plate 66 has been pivoted over the tab 204, so that the tab 204 is through the opening 202. FIG. 8A provides another exemplary view of the mounting plate 66 in a secured position, with the opening 202 over the tab 204. When pivoting over the tab 204, the plate 66 flexes or resiliently moves before returning to a static state when the tab 204 is through the opening 202. In one embodiment, the plate 64 is formed of a metal thickness configured to slightly flex or resiliently move as desired.

While FIGS. 11A-11C show the mount plate 66 engaging the frame support 60, the mount plate 64 may similarly engage the frame support 62.

It is contemplated that a spa cover 4 may be attached to two spa lift devices, e.g., spa lifts 10 and 12. In one embodiment, a first spa lift includes an electric motor 82, while the second spa lift does not.

Figure 12A:
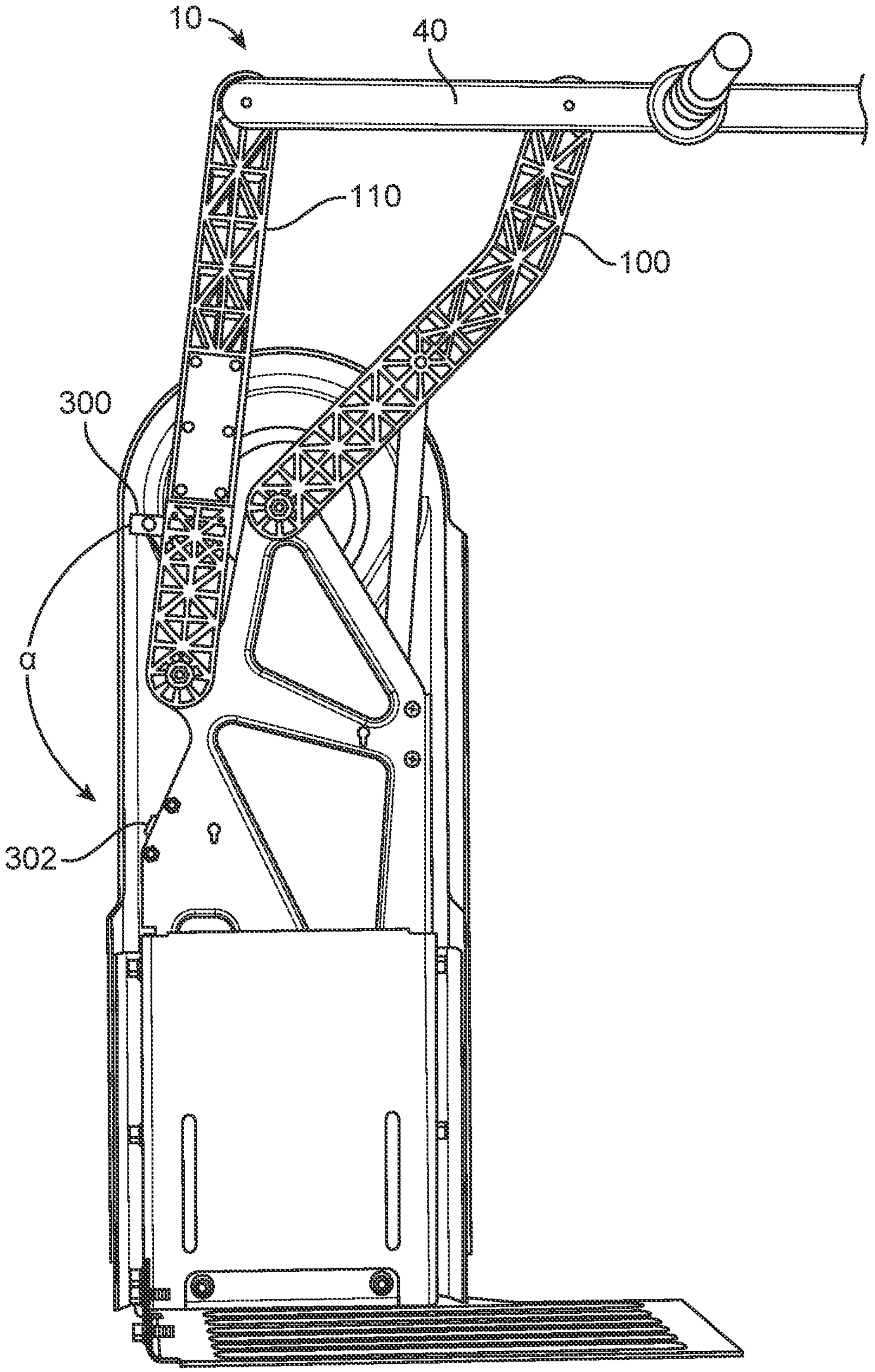
FIGS. 12A-12C are various views of an embodiment of the spa lift device to illustrate a stabilizing feature useful in the stored state position, in accordance with the present disclosure.
Figure 12B:
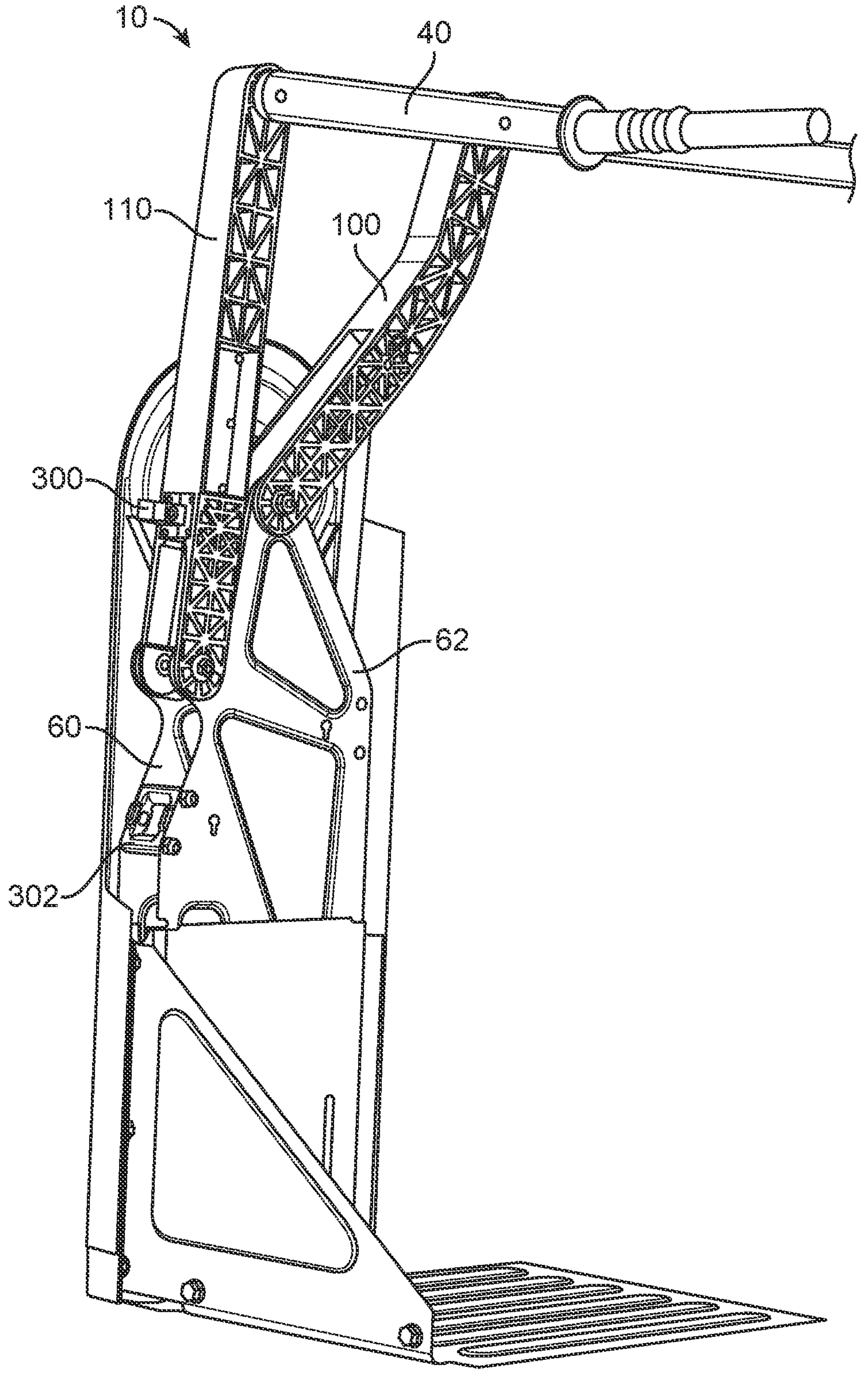
Figure 12C:
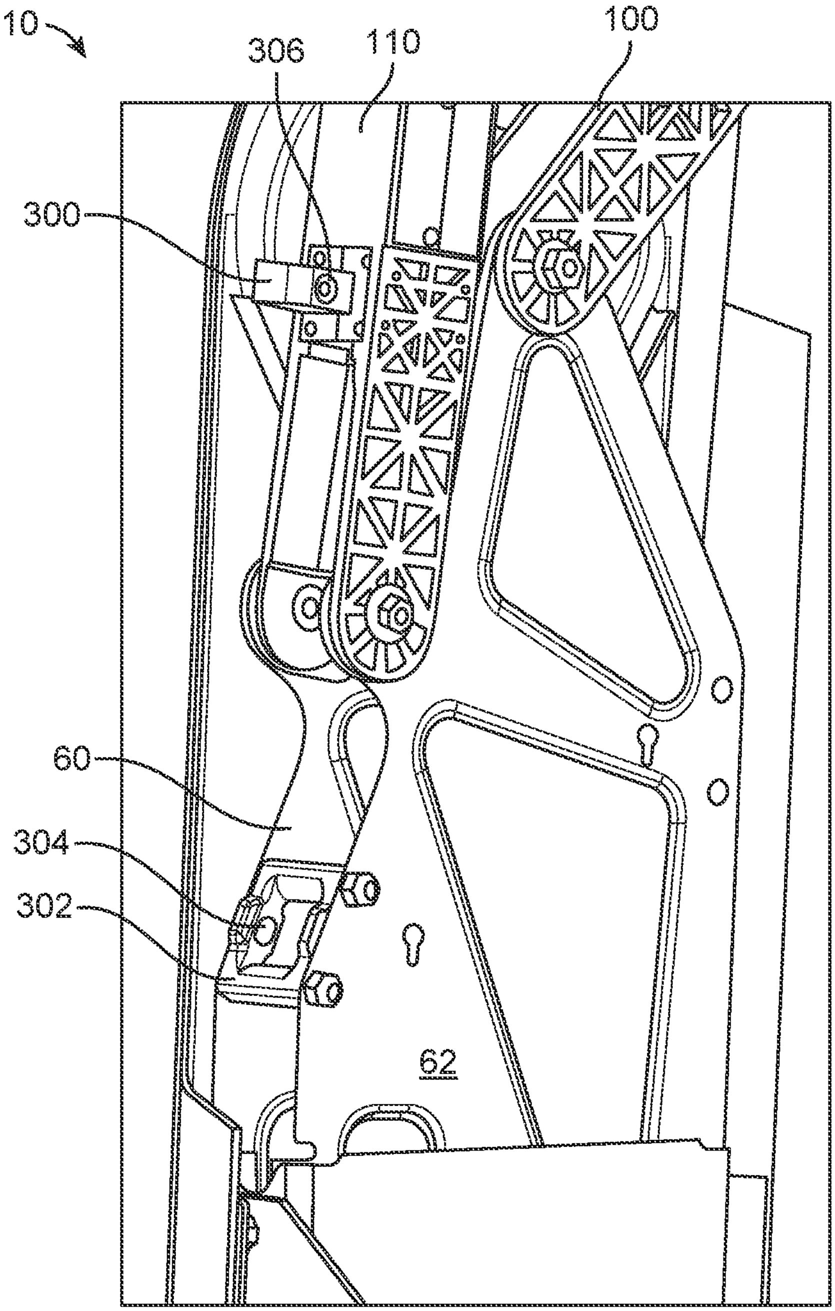

FIGS. 12A-12C show an exemplary embodiment of the spa lift device 10. As FIGS. 12A-12C show, the spa lift device 10 can include a protruding tab 300 and a stop 302. In this way, when the lift arm 40 rotates between a "covered state" and the "stored state" such as by motion a shown in FIG. 12A, the tab 300 will be inserted through an opening on the stop 302, thereby inhibiting further motion.

The protruding tab 300 is preferably connected to a surface of the arm 110, while the stop 302 is preferably connected to the frame supports 60 and 62. In one embodiment, the protruding tab 300 is mechanically connected to the arm 110. In one embodiment, the stop 302 is mechanically connected between the frame supports 60 and 62.

In one embodiment the protruding tab 300 includes a detent ball device 306 configured to hold the protruding tab 300 within the stop 302. In one embodiment, the stop includes a surface corresponding to a detent ball of the detent ball device for temporarily receiving the detent ball. As FIG. 12 C shows, the protruding tab 300 includes the detent ball device 306 on a first side of the protruding tab 300; in one embodiment, another detent ball device is included on an opposing side to temporarily couple to surface 304 of the stop 302. Likewise, the stop 302 includes, in one embodiment, a second surface opposite the surface 304 configured to temporarily couple to the detent ball device 306.

Additionally, examples in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In the above description, certain terms or prefixes may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

The invention claimed is:

1. A spa cover lift comprising:

a support structure; and a lifting structure coupled to the support structure, the lifting structure having an actuator configured to store and release energy during lifting and storing of a spa cover, wherein the lifting structure is selectively coupled to the support structure using an interference fit connection made among parallel portions of brackets of the support structure and portions of the lifting structure, wherein the parallel portions of brackets of the support structure are C-shaped and the portions of the lifting structure are formed to couple to the C-shaped portions of the support structure.

2. The spa cover lift of claim 1, wherein the support structure further comprises:

a base plate configured to slide under a spa; and a gusset plate coupled to the base plate.

3. The spa cover lift of claim 1, wherein the actuator is a gas spring.

4. The spa cover lift of claim 1, wherein the actuator is a hydraulic actuator.

5. The spa cover lift of claim 1, wherein the actuator is a mechanical actuator.

6. The spa cover lift of claim 1, wherein the lifting structure further comprises:

an elongated lift arm member having a handle;

a first arm pivotally coupled to the arm member and pivotally coupled to an arm frame support;

a second arm pivotally coupled to the arm member and pivotally coupled to the arm frame support, wherein the arm frame support is coupled to the support structure; and wherein the actuator is pivotally coupled to the arm frame support and pivotally coupled to the first arm.

7. The spa cover lift of claim 6, wherein the actuator is configured to function as a dampener during a portion of a transition from a "covered state" and a "stored state".

8. The spa cover lift of claim 6, wherein the actuator is configured to function as a spring during a portion of a transition from a "stored state" and a "covered state".

9. The spa cover lift of claim 6, wherein the elongated lift arm member comprises a plurality of augers configured for insertion into a spa cover.

10. The spa cover lift of claim 9, wherein the augers include annular barbs.

11. A spa cover lift comprising:

a support structure including a base plate; and a lifting structure coupled to the support structure, the lifting structure including an actuator configured to store and release energy during lifting and storing of a spa cover, and an electro-mechanical actuator configured to selectively actuate during lifting and storing of the spa cover, wherein the lifting structure is selectively coupled to the support structure using an interference fit connection made among parallel portions of brackets of the support structure and portions of the lifting structure, wherein the parallel portions of brackets of the support structure are C-shaped and the portions of the lifting structure are formed to couple to a C-shaped portion of the support structure.

12. The spa cover lift of claim 11, wherein the base plate is configured to slide under a spa, and wherein the support structure further comprises:

a gusset plate coupled to the base plate.

13. The spa cover lift of claim 11, wherein the actuator is one of a gas spring, a hydraulic actuator, and a mechanical actuator.

14. A spa cover lift comprising:

a support structure including a base plate; and a lifting structure coupled to the support structure, the lifting structure including an actuator configured to store and release energy during lifting and storing of a spa cover, and an electro-mechanical actuator configured to selectively actuate during lifting and storing of the spa cover, wherein the lifting structure further comprises:

an elongated lift arm member having a handle;

a first arm pivotally coupled to the arm member and pivotally coupled to an arm frame support;

a second arm pivotally coupled to the arm member and pivotally coupled to the arm frame support, wherein the arm frame support is coupled to the support structure; and wherein the actuator is pivotally coupled to the arm frame support and pivotally coupled to the first arm, and wherein the electro-mechanical actuator is pivotally coupled to the arm frame support and is pivotally coupled to the second arm via a rotating knuckle plate that is pivotally coupled to the second arm, and wherein a third actuator is pivotally coupled to the rotating knuckle plate and pivotally coupled to the second arm and is configured to dampen rotation of the spa cover before reaching a "stored state".

15. The spa cover lift of claim 14, wherein the actuator is configured to function as a dampener during a portion of a transition from a "covered state" and a "stored state".

16. The spa cover lift of claim 14, wherein the actuator is configured to function as a spring during a portion of a transition from a "stored state" and a "covered state".

17. The spa cover lift of claim 14, wherein the elongated lift arm member comprises a plurality of augers configured for insertion into a spa cover.

18. The spa cover lift of claim 17, wherein the augers include annular barbs.

* * * * *